(12) United States Patent
Kawano et al.

(10) Patent No.: US 7,339,148 B2
(45) Date of Patent: Mar. 4, 2008

(54) CONFOCAL MICROSCOPE

(75) Inventors: Yoshihiro Kawano, Hicksville, NY (US); Kiyoshi Koike, Hicksville, NY (US)

(73) Assignee: Olympus America Inc., Center Valley, PA (US)

( * ) Notice: Subject to any disclaimer, the term of this patent is extended or adjusted under 35 U.S.C. 154(b) by 237 days.

(21) Appl. No.: 10/682,236

(22) Filed: Oct. 9, 2003

(65) Prior Publication Data

US 2004/0113059 A1 Jun. 17, 2004

Related U.S. Application Data

(60) Provisional application No. 60/433,825, filed on Dec. 16, 2002.

(51) Int. Cl.
*G02B 7/04* (2006.01)
*G02B 26/00* (2006.01)
*G02B 21/00* (2006.01)
*H01J 3/14* (2006.01)
*G01C 3/00* (2006.01)
*G01J 3/42* (2006.01)

(52) U.S. Cl. .................. 250/201.3; 250/216; 250/235; 356/3.09; 356/323; 359/291; 359/368

(58) Field of Classification Search ................ 359/205, 359/215, 290, 291, 298, 368, 385, 206, 316, 359/346, 355, 201; 356/301, 317, 318, 417, 356/601, 3.09, 305, 308, 309, 323; 250/234, 250/235, 236, 201.3, 202, 559.06, 559.48, 250/227.26, 230, 208.1, 216, 559.4
See application file for complete search history.

(56) References Cited

U.S. PATENT DOCUMENTS

| | | | |
|---|---|---|---|
| 5,081,349 A * | 1/1992 | Iwasaki | 250/234 |
| 6,028,306 A | 2/2000 | Hayashi | |
| 6,128,077 A * | 10/2000 | Jovin et al. | 356/310 |
| 6,483,641 B1 | 11/2002 | MacAulay | |
| 6,663,560 B2 * | 12/2003 | MacAulay et al. | 600/160 |
| 6,844,920 B2 * | 1/2005 | Luellau | 355/67 |
| 6,922,279 B2 * | 7/2005 | Sun et al. | 359/329 |
| 2002/0024015 A1 * | 2/2002 | Hoffmann et al. | 250/311 |

* cited by examiner

*Primary Examiner*—Georgia Epps
*Assistant Examiner*—Don Williams
(74) *Attorney, Agent, or Firm*—Scott, Scully, Murphy & Presser, P.C.

(57) ABSTRACT

A scanning optical microscope including: a light source; a lens for altering the cross-sectional shape aspect ratio of a beam of light emitted from the light source; at least one lens for converging beams of light of different cross-sectional shape aspect ratio to create a linear light; a first light modulation member able to impart shade to the converged linear light; a lens that can form the light to which the shade has been imparted as a parallel light; a scanning member that can alter the angle of illumination; a lens for focusing the light to which the shade has been imparted; an objective lens for projecting the light to which the shading has been imparted to a sample body; and a lens for imaging the reflected light from the sample body or the light generated by the sample body on to a sensor.

25 Claims, 20 Drawing Sheets

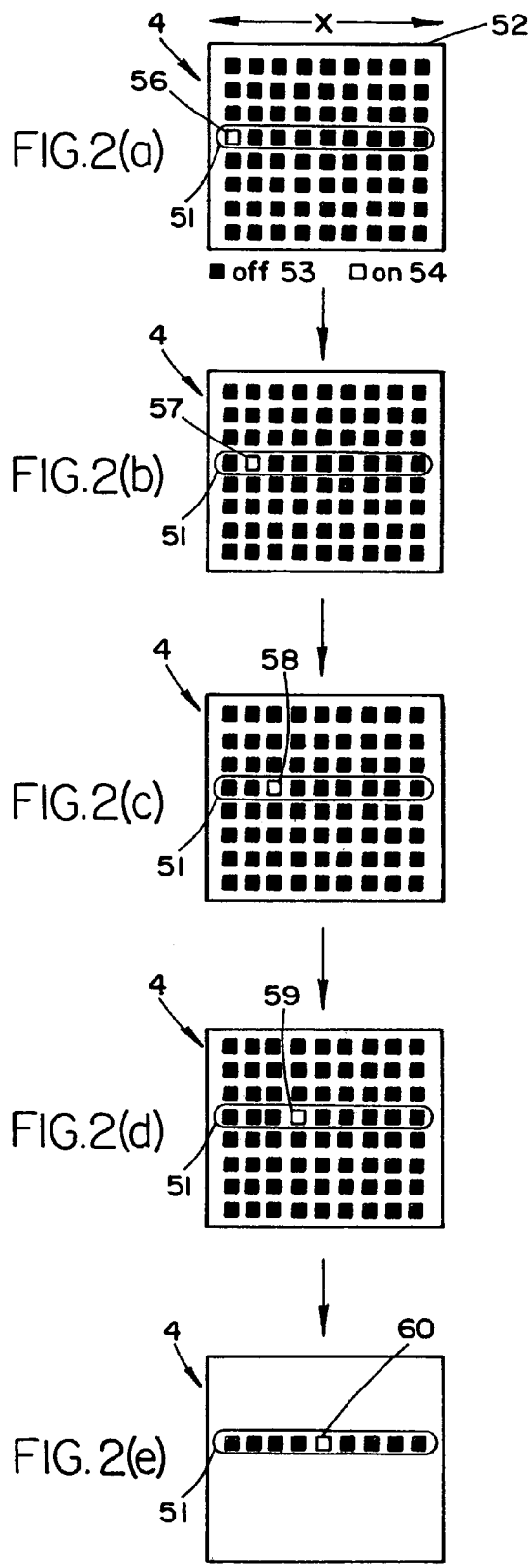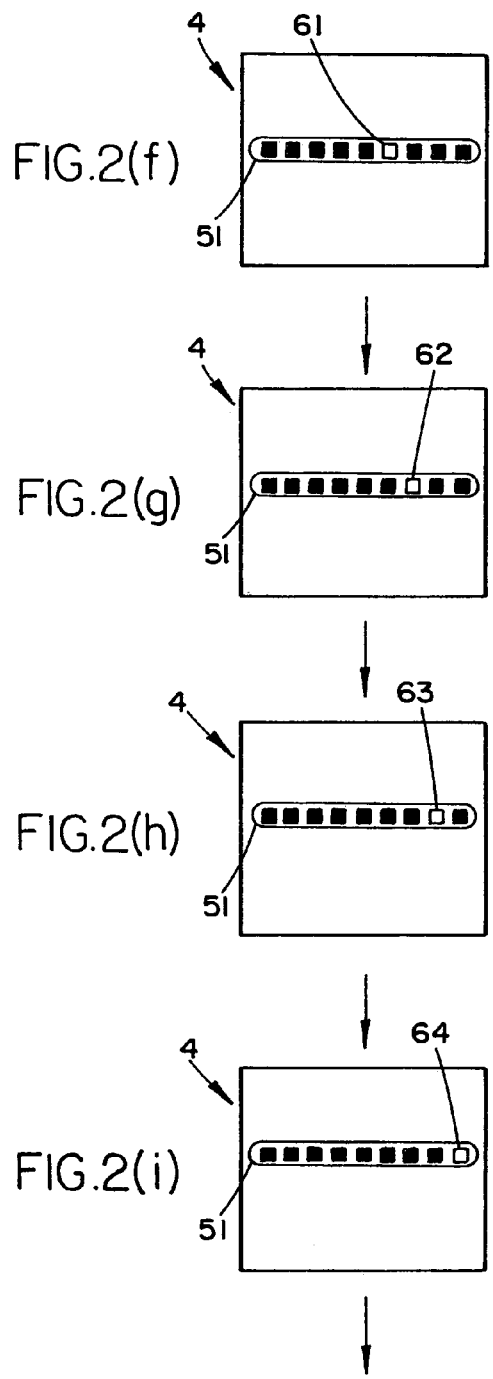
Movement of the galvano mirror one line section in the Y-axis

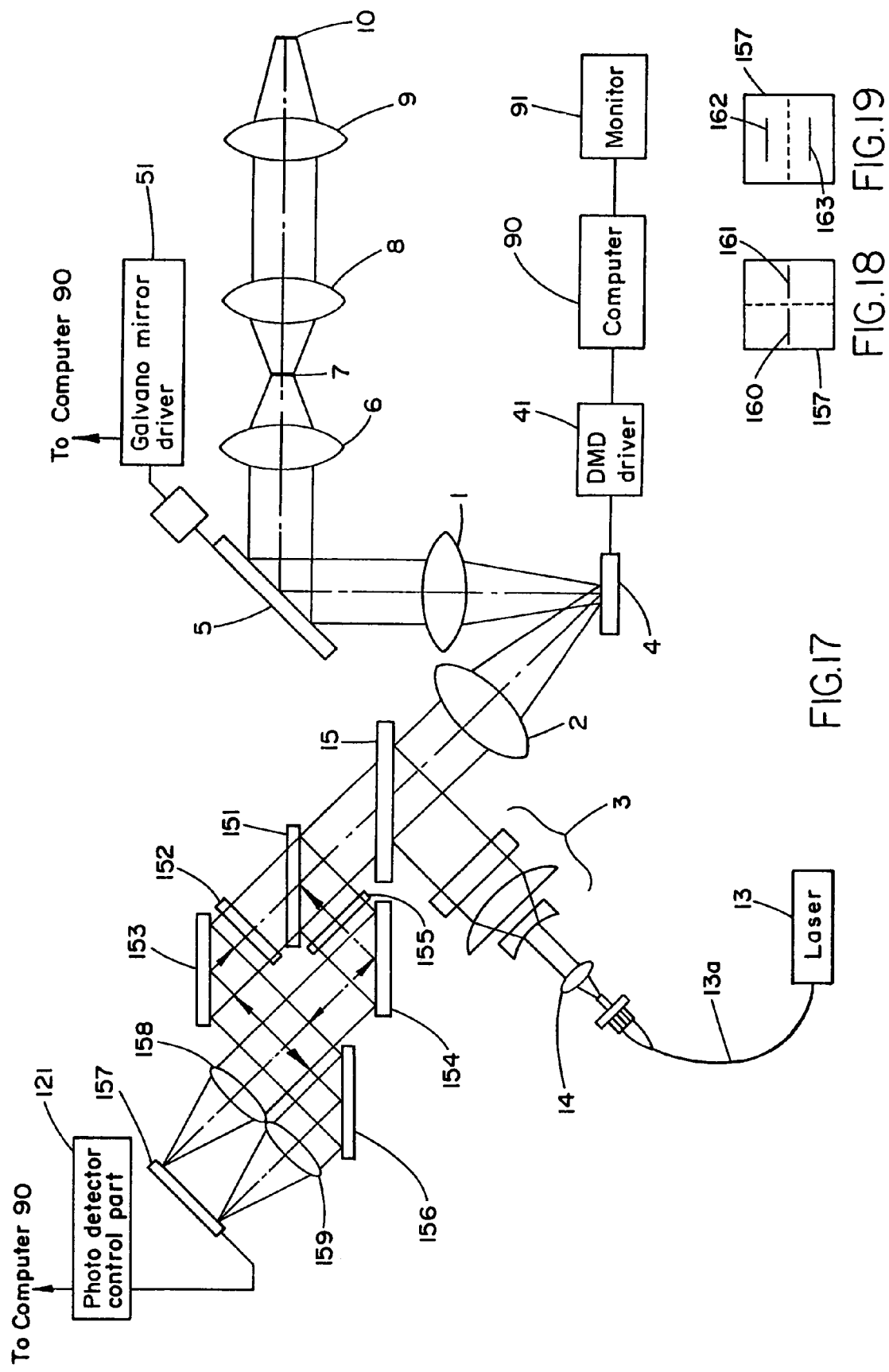

CONFOCAL MICROSCOPE

CROSS REFERENCE TO RELATED APPLICATION

This application claims the benefit of U.S. Provisional Application Ser. No. 60/433,825 filed on Dec. 16, 2002, the entire contents of which is incorporated herein by its reference.

BACKGROUND OF THE INVENTION

1. Field of the Invention

The present invention relates generally to microscopes, and more particularly, to optical microscopes, confocal microscopes, fluorescence microscopes and spectral microscopes.

2. Prior Art

There has been a growing demand in recent years for scanning microscopes and confocal microscopes that afford scanning and imaging at high speed. Although hitherto disclosed microscopes include a disk scanner microscope (U.S. Pat. No. 5,717,519) in which the process of tandem scanning is improved and in which, for example, a lens array is employed, using this method, the alteration of the pinhole diameter is difficult and the setting of the optimum confocal pinhole diameter within the objective lens is very difficult. Additionally, in this method, the adjustment and centering of a plurality of pinholes and lens array is technically difficult. In addition, although, for a sample body in which there is extensive scattering, single-point scanning of the sample body can improve the contrast of the image, the process of changeover from multiple-point scanning to single-point scanning is very difficult.

In addition, although a method for producing an image by the scanning of an array comprising a plurality of focal points in a small range and a method for producing an image in which a plurality of linear laser beams are scanned over a small range have been disclosed (U.S. Pat. No. 6,028,306), using these methods, the adjustment and centering of a plurality of pinholes and lens array is technically difficult. In addition, because a large number of pinholes are present on the entire surface in the field of view, there are times when, in the observation of a sample body that is thick and has extensive scattering, the contrast of the image is reduced due to the scattering of the sample body. In addition, although, for a sample body in which there is extensive scattering, single-point scanning of the sample body can raise the contrast of the image, the process of changeover from multiple-point scanning to single-point scanning is very difficult.

Furthermore, a line scanning confocal microscope described in the Handbook of Biological Microscopy Second edition Chapter 25, page 406, FIG. 2(b), has been disclosed and although, using this method, because a line scanner is employed, the confocal effect is increased only in the X direction or Y direction at one side of the image, because the confocal effect is lowered on the opposing side, the resolution is lower than for a single-point or multiple point confocal microscope. In addition, the implementation of line sequence scanning in which the scanning excitation wavelength is altered for each wavelength is very difficult. In addition, the magnification cannot be altered easily without the employment of a relay system and, furthermore, the setting of the optimum scanning speed for the sample body is difficult.

In addition, although a two-photon microscope has been disclosed in which an MMM (Multi-focal Multi-photon Microscopy, Stefan W. Hell, U.S. Pat. No. 6,262,423) is employed, the microscope of this configuration does not comprise a confocal aperture. In addition, because the adoption of a configuration in which a confocal aperture is inserted into the microscope is difficult, the improvement of this method by the production of a confocal point is very difficult.

In addition, although a video rate scanning microscope has been disclosed in which an AOTF (Acousto-Optical Tunable Filter) is employed (U.S. Pat. No. 4,893,008), aberrations are produced when this microscope is used due to the effect of the AOTF on the laser beam itself which ejects the AOTF. As a result, there are times when the resolution is inferior to that of a point scanning-type laser scanning optical microscope.

In addition, in point scanning-type laser scanning microscopes that employ a galvanometer mirror such as that disclosed in the Handbook of Biological Microscopy Second edition Chapter 9, pages 139-154, because the sample body cannot be scanned at a plurality of points and the galvanometer mirror cannot be shaken at high speed, the scanning speed is very slow.

In addition, although scanning microscopes that use a resonance galvano have previously been disclosed, the scanning speed cannot be freely controlled using a resonance galvano. This is a particular difficulty even when the scanning is slow and even when the photometry position is fixed for the implementation of the photometry of a single-point light.

In addition, hitherto devised single-point scanning confocal microscopes as disclosed in U.S. Pat. No. 6,069,734 cannot accommodate objective lens of large pupil diameter. To accommodate lens of this type a galvanometer mirror comprising a mirror of large diameter must be adopted but, because the scanning of a large diameter galvanometer mirror at high speed is very difficult, the actualization of high speed scanning has, to this point, proven difficult.

Although micro-mirrors are employed in the present invention, the confocal image projected on to the photo detector which is, strictly speaking, a point light, dot light or line-shaped light rather than a two-dimensional image, does not constitute a two-dimensional image. To that end, the present invention is fundamentally different to the methods of observation that employ a DMD such as that disclosed in U.S. Pat. No. 5,597,832, U.S. Pat. No. 5,923,466 and U.S. Pat. No. 6,038,067).

SUMMARY OF THE INVENTION

Therefore it is an object of the present invention to provide a confocal microscope that will fulfill one or more of the following conditions:

(1) Able to work at a high-speed scanning.

(2) Able to produce high image resolution by the generation of a confocal effect in both the X and Y directions of the image.

(3) Diameter of the confocal aperture can be altered easily.

(4) Changeover between single-point scanning, multiple-point scanning and line scanning is possible.

(5) Reflected light observation and fluorescence observation is possible.

(6) Fluorescence observation can be achieved by multi-photon excitation such as two-photon and three-photon excitation.

(7) Can be used with normal objective lens and objective lens pupil diameter is large.

(8) Reflected light, transmitted light, fluorescence, non-linear light and Raman spectral data can be obtained from the sample.

(9) Images can be produced by light of such as SHG (Second Harmonic Generation), THG (Third Harmonic Generation), CARS (Coherent Anti-Strokes Raman Scattering) and Raman.

Using the confocal microscopes of the prior art the mere co-existence of the two points of (1) "High speed scanning" and (2) "Generation of the confocal effect in both the X and Y directions of the image" has been difficult to achieve. Moreover, the simultaneous fulfillment of the above-noted nine conditions has been extremely difficult. Hitherto, if there has been a desire to produce an image scanned at high speed by the employment of a single-point illumination method confocal microscope that employs a galvanometer mirror, because the image cannot be produced unless the voltage of the PMT (Photo Multiplier Tube) is increased significantly, the images that have been formed is noisy. In addition, although an image with high efficiency illumination at high speed and which is high efficiency than that obtainable using a single-point illumination method confocal microscope is produced when a line scanning confocal microscope is employed, the confocal effect, as with the single-point illumination method confocal microscope, can only be produced in one of either the X or the Y direction of the image.

Thereupon, by the adoption of a scanning optical microscope characterized in that it is configured from an illumination light source, a lens member necessary for altering the cross-sectional shape aspect ratio of the beam of light emitted from the light source, at least one lens for converging beams of light of different cross-sectional shape aspect ratio to create a linear light, a light modulation member able to impart shade to the converged linear light; at least one lens that can form the light to which the shade has been imparted as a parallel light, at least one scanning member that can alter the angle of illumination, at least one lens for imaging the light to which the shade has been imparted in one action, an objective lens that is employed to guide the light to which the shading has been imparted to a sample body, at least one lens necessary for imaging the reflected light from the sample body or the light generated from the sample body on to a line sensor, imaging device or photo detector, along with a line sensor, imaging device or photo detector, high speed scanning speeds and a confocal effect in both the X and Y directions of the image can be produced.

This scanning optical microscope is further characterized by the employment of a laser beam or a white light source such as a high-pressure mercury lamp, xenon lamp, halogen lamp or metal halide lamp as the illumination light source. The illumination light source can be designed to deal with a variety of light sources by the alteration of the optical system between the light source and an element for separating the illumination light and the observation light from the ejection end of the fiber that has connection to the light source (beam splitter), by way of example, a dichroic mirror, AOD, holographic notch filter, glass plate or half mirror.

Furthermore, using a computer, the start and stop operations of the scanning member and the regulation of the scanning speed thereof can be implemented, the illumination pattern of the light modulation member can be altered, and the ON/OFF irradiation of the illumination light on the sample body can be controlled. As a result, the sample body can be scanned in a variety of patterns. By way of example, the sample body can be single-point scanned, the sample body can be multiple-point scanned, the sample body can be scanned in lines, and light can be made to fall incident on just one segment of the sample body.

Furthermore, if a high sensitivity cooled CCD camera, back-illuminated CCD camera or cascade camera, or CCD camera with an image intensifier or the like are employed as the imaging device, very weak light can be captured.

Furthermore, by the scanning of the illumination light using a galvanometer mirror and the illumination of the sample body by the timed shifting of a single-point illumination light temporally employing a mirror or diaphragm of a size that achieves the resolution limit of the light modulation member in which the shade pattern is alterable, a confocal aperture effect can be generated in both the X and Y directions of the image.

Furthermore, where scanning of the sample body at high speed is desired, by the illumination of the sample body by the imparting of a pattern of alternating shade at each single point on the light modulation member in which the shade pattern is alterable and, furthermore, the shifting of this shade pattern, a plurality of points can be simultaneously illuminated so that a confocal aperture effect can be generated in both the X and Y directions of the image and, furthermore, so that the image can be acquired at high speed.

Furthermore, if scanning at high speed is desired and, if line-scanning illumination is implemented, the line scanning confocal microscope can be actualized in such a way that the light modulation member in which the shade pattern is alterable can be linearly illuminated.

Furthermore, if a reducing of the confocal effect or the imparting of bright illumination is desired, the same effect as the effect obtained when the confocal aperture is opened can be produced by the employment of a mirror or diaphragm of a surface area that is significantly larger than the resolution limit for a single point of the light modulation member in which the shading pattern is alterable, or by the simultaneous transmission or reflection thereof through the adjacent plurality of mirrors or diaphragms.

Furthermore, there are times when, even with the use of a confocal microscope, the observation of an image of depth as deep as that for a reflecting microscope or fluorescence microscope is desired. In the present invention, because a two-dimensional element is employed as the light modulation member in which the shade pattern is alterable and the laser light can be led to the whole of the sample body surface and, furthermore, the image of the sample body can be projected, unaltered, on to the imaging device by the scanning of the scanner to illuminate the illumination light across the whole field of view, the reflected light and fluorescence of a normal sample body can be observed.

Furthermore, in addition to the single-photon excitation fluorescence observation which has hitherto made observation possible, a demand has arisen for fluorescence image observation which, based on multi-photon excitation such as two-photon excitation or three-photon excitation, uses a femto-second laser or the like such as a titanium sapphire laser. Observation of the fluorescence image is possible in the present invention using two-photon excitation or three-photon excitation by the employment of, for the production of the illumination light, an ultra-short pulse light source such as a titanium sapphire laser.

Additionally, although there are times when spectral diffraction of the fluorescence or reflected light from the sample body is desired, this is difficult using the hitherto employed techniques. Using the present invention, a spectral device can be configured by the insertion of a diffraction grating or Acousto-Optic Modulator (AOM) between the imaging device and the light modulation member, and the employment as the imaging device of, for example, a CCD camera that constitutes a two-dimensional imaging device. If an Acousto-Optic Modulator is employed, the changeover between spectral measurement and normal measurement can be implemented by the turning ON and OFF of an electrical switch.

In addition, if an ultra-short pulse light source is employed, reception of nonlinear light generated from the sample body, by way of example, secondary harmonic generation, third harmonic generation, Raman light, and CARS (Coherent Anti-Strokes Raman Scattering) is possible. In this case, the optical characteristics of the part for dividing the illumination light and the received light of the present invention, and with the band pass filter or spectral element provided in front of the photo detector must be optimized. The part for dividing the illumination light and the received light refers to, for example, a dichroic mirror for reflecting the illumination light, or, a holographic notch filter to which the illumination light is led, which are provided between the light source and the light strength light modulation member. In addition, the band pass filter or spectral element provided in front of the light-receiving element constitutes an Acousto-Optic Modulator AOM or interference filter for restricting the range of the wavelength of the light received and is inserted between the photo detector and the part for dividing the illumination light and the received light. For CARS (Coherent Anti-Stoke Raman Scattering), the illumination must be performed using an ultra-short pulse light source of two different wavelengths.

In addition, if the ON and OFF of the light modulation member and the phase cycle of the galvanometer mirror is used properly the light can be irradiated on the prescribed position only of the surface of the sample body. In addition, if a laser that produces a plurality of wavelengths is employed as the light source the illuminated wavelength can be changed over, or, if a mercury lamp, xenon lamp, metal halide lamp and halogen lamp or the like is employed, the light generated from these light sources can be selectively irradiated on the sample body. By virtue of this, the scattering of a fluorescent pigment can be observed by, for example, employing stained cells or cell groups as the sample body and causing one part of said cells to bleach. If protein is imparted to the dye, the diffusion of the protein can be seen at high speed. In addition, if a caged compound is employed, localized increases in the concentration of the calcium and the like are possible. Although, by way of example, a means has been disclosed for the measurement of changes of a cell that follows the introduction of caged calcium on a sample body comprising cells or cell groups, the illumination of specific sections of the cell to release the caged calcium, and the localized increase of the concentration of the calcium, the present invention can also accommodate the tests and observations of this type.

In summary, in the microscope of the present invention, light from a light source is linearly converge to fall incident on a light modulation element such as a DMD or liquid crystal. Next, following the modulation of the linear light by the light modulation element into a light with a prescribed shade along the direction of the rays thereof, the light is irradiated on the sample body. The light generated from the sample body (reflected light and fluorescent light and so on) is returned to said light modulating member, after which it is separated from the illumination optical path and detected by a photo detector. Examples of the light detecting element that is employed include a one-dimensional line sensor and a two-dimensional CD camera.

The "bright" sections of the linear light comprising the shade patterns are, while being successively moved, sequentially detected by the light detection element, and the detected images correspondence to each of the shade patterns are accumulated. Following this, the detected images of the single segments are synthesized in a subsequent step. To form a two-dimensional picture, the linear light is scanned using a galvanometer mirror or the like.

Accordingly, a scanning optical microscope is provided. The scanning optical microscope comprises: an illumination light source; a lens member for altering the cross-sectional shape aspect ratio of a beam of light emitted from the light source; at least one lens for converging beams of light of different cross-sectional shape aspect ratio to create a linear light; a first light modulation member for imparting shade to the converged linear light; at least one lens for forming the light to which the shade has been imparted as a parallel light; at least one scanning member for altering the angle of illumination; at least one lens for focusing the light to which the shade has been imparted; an objective lens for projecting the light to which the shading has been imparted to a sample body; and at least one lens for imaging the reflected light from the sample body or the light generated by the sample body on a light detecting element.

BRIEF DESCRIPTION OF THE DRAWINGS

These and other features, aspects, and advantages of the apparatus and methods of the present invention will become better understood with regard to the following description, appended claims, and accompanying drawings where:

FIGS. 2(a)-2(i) illustrate mirror on/off patterns for a light modulator member implemented for the confocal microscope of FIGS. 1(a) and 1(b) where single-point illumination of the sample body is performed.

In FIG. 17, illustrates by an optical system in which the light from the sample body is split and directed in two paths to a two-dimensional photo detector.

FIG. 18 illustrates the photo detector of FIG. 17 in which two line shaped lights are juxtaposed in the lateral direction and received by the photo detector.

FIG. 19 illustrates the photo detector of FIG. 17 in which two line shaped lights are juxtaposed in the vertical direction and received by the photo detector.

DETAILED DESCRIPTION OF THE PREFERRED EMBODIMENT

Figure 1A:
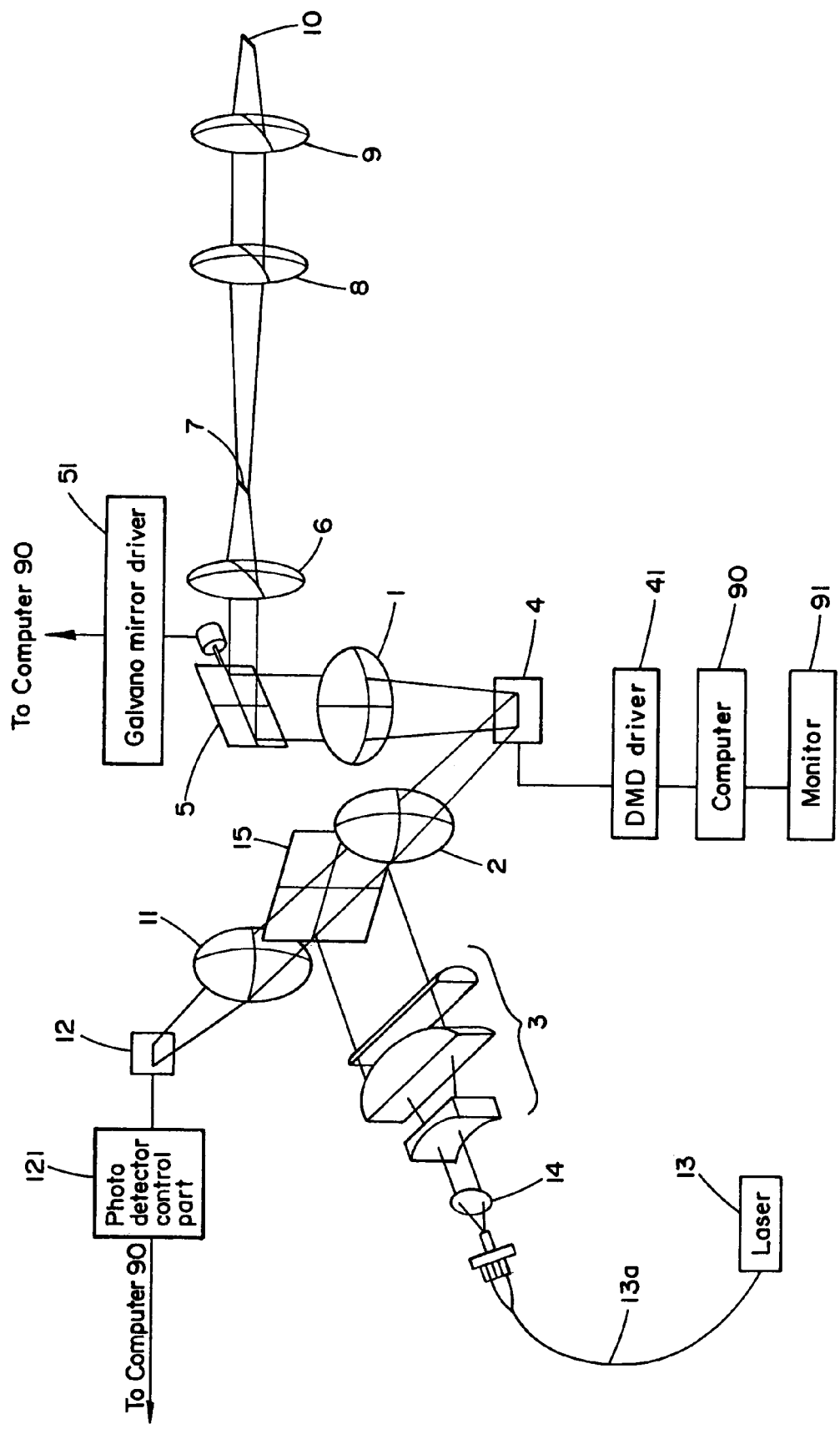
FIG. 1(a) represents a diagonal view of the optical system of this device.
Figure 1B:
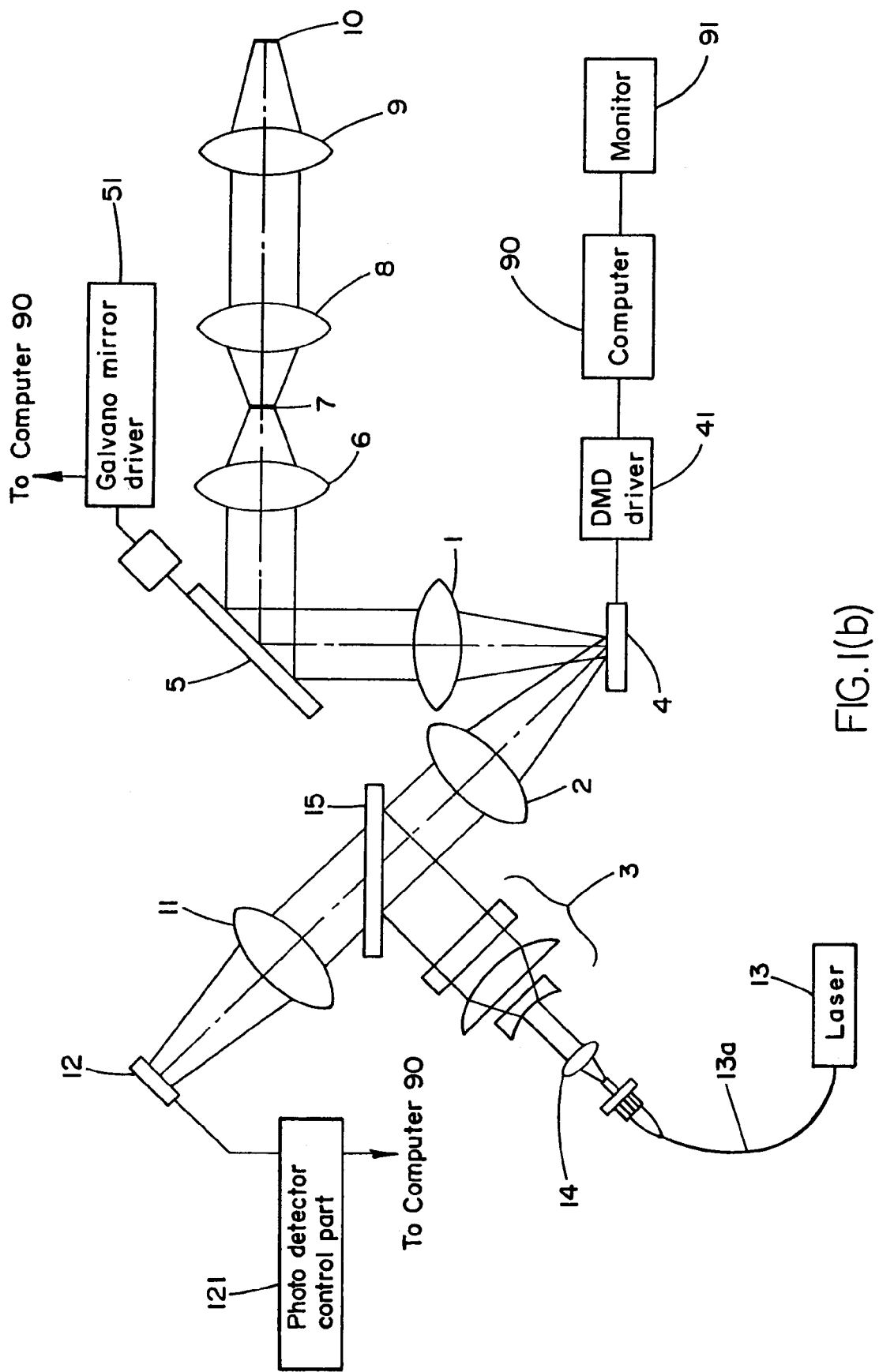
FIG. 1(b) represents the view thereof from above.

Referring now to FIGS. 1(a) and 1(b), a description is given of a first embodiment of an optical system of the present invention. FIG. 1(a) represents a diagonal view of the optical system of the first embodiment, and FIG. 1(b) represents the view thereof from above. The illumination in the configuration of the device of the present invention is implemented by the employment of a laser 13. If a continuous wave laser is employed the light can be introduced into the device by way of a single mode fiber 13a. The introduced light is formed as a parallel light beam by a collimator lens 14. If a laser for implementing an ultra short pulse light, by way of example, of a femto-second, is employed, the light can be introduced by the employment of a hollow optical fiber 13a. If the employment of a hollow optical fiber 13a is undesirable, the laser light may be introduced directly to the device.

The introduced laser passes through the lens 3, which constitutes a lens necessary for altering the cross-sectional shape aspect ratio of the beam member and which is configured from at least one cylindrical lens or at least one f-theta lens, and is converted to a laser light in which the cross-sectional shape aspect ratio of the beam is different. Lens 3 consists of at least one cylindrical lens. The cylindrical lens converts a parallel laser beam to the cross-sectional shape aspect ratio of the beam. It is desirable that the color aberrations are corrected so that the cylindrical lens or the f lens and so on can accommodate a broad range of wavelengths. Laser light in which the cross-sectional shape aspect ratio of the beam is different can be more brightly illuminated on the object surface than expanded laser illumination because it is a linear infinite beam possessing a degree of width.

The laser light in which the cross-sectional shape aspect ratio of the beam is reflected from a beam splitter 15. The beam splitter 15 can comprise a dichroic mirror, or half mirror of a reflecting ratio of the order of 50-2%, or a glass plate that reflects a small amount of the illumination light. The light then falls incident on a lens 2, which constitutes a laser converging lens configured from at least one lens for converging laser light in which the cross-sectional shape aspect ratio of the beam is different. The light ejected on to the lens 2 is converged and formed as a linear light. In addition, the lens 2, in such a way that it can linearly converge light of a plurality of different wavelengths on the same position, requires that the color aberrations have been corrected.

The converged linear laser light falls incident on a light modulation member 4 for implementing modulation in such a way as to comprise sections of bright strength and sections of dark strength, whereupon it is transmitted or reflected. The light modulation member 4, which comprises a plurality of small reflection mirrors (discussed in detail below), may employ a DMD (Digital Mirror Device) that is characterized by the switching ON and OFF of the small reflecting mirrors, or an SLM (spatial light modulator) or a liquid crystal plate able to change the transmissivity. A DMD is employed in the first embodiment. When each of the small reflection mirrors are switched ON by the DMD the light that falls incident on the mirrors is reflected to the optical path of the microscope (lens 1 side) and, when it is turned OFF, the light is reflected in a direction away from the optical path of the microscope. Accordingly, by the ON and OFF control of the small mirrors, the light that falls incident on the DMD is modulated from a converged linear laser light to a linear laser light in which a shade pattern has been imparted, or it is reflected. If a liquid crystal plate is used, the light that falls incident on the liquid crystal plate can be modulated to a linear laser light in which a shade pattern has been imparted due to the changes in the transmissivity produced as it transmitted through the liquid crystal plate.

The linear laser light in which a shade pattern has been imparted falls incident on a lens 1 which constitutes a lens for converting light to a parallel light with width, and dot light, which is formed as a parallel light with width, falls incident on a galvanometer mirror 5. The galvanometer mirror 5 has the role of altering the angle of the parallel light with width over time by the shaking of the mirror. After passing through a pupil lens 6, the parallel light with width is focused at a position 7 between the pupil lens and an imaging lens 8. It is desirable that the color aberrations be corrected in such a way that the pupil lens 6 can accommodate a broad range of wavelengths.

The linear laser light, which the shade pattern has been imparted and which is transmitted through the pupil lens to be re-imaged at a position 7 between the pupil lens and an imaging lens 8, is transmitted through the imaging lens 8 and imaged on the sample body surface 10 by an objective lens 9.

The light focused on the sample body surface is reflected or converted to fluorescence by a fluorescence generating material to be transmitted through the objective lens 9 whereupon, after further transmission though the imaging lens 8, it is imaged at the primary image surface position 7, transmitted though the pupil lens 6 to be reflected by the galvanometer mirror 5, cause to fall incident on the lens 1, imaged on the light modulation member 4 which constitutes a secondary imaging surface, and reflected or transmitted by the light modulation member 4. The light modulation member 4 fulfills the role of a confocal aperture. The light which is reflected by or transmitted by the light modulation member 4 is formed as a parallel light by the lens 2, and is transmitted through the beam splitter 15 configured from a dichroic mirror, a half mirror or a glass plate, and is transmitted through a lens 11 and imaged on a photo detector 12.

A laser light source 13, which is able to employ a single wavelength laser, may also employ a laser of a plurality of wavelengths. For a laser of plurality of wavelengths either an argon laser or krypton/argon laser that emits a plurality of wavelengths or a laser beam combiner in which a plurality of laser are combined can be employed so that only the target wavelength is selected.

By virtue of the fact that the photo detector 12, the light modulation member 4 and the galvanometer mirror 5 are connected to a computer 90 by, respectively, a photo detector control part 121, a DMD driver 41 and a galvano-mirror driver 51 and they can be mutually linked and driven, and a picture image can be formed. In addition, a monitor 91 is connected to the computer 90, and the picture image formed by the computer 90 can be displayed on this monitor 91.

If the confocal microscope of the first embodiment is employed and single-point illumination of the sample body is performed, the flow of the process that is implemented is as shown in FIGS. 2(a)-2(i). In reality, a DMD configured from a plurality of mirrors of 1024×768 pixels or 1280×1024 pixels is employed but, in FIGS. 2(a)-2(i), an explanation of the principles thereof is given using a virtual DMD configured from a 9×8 pixel mirror array. The illumination light is irradiated by the lens 2 on to a DMD that constitutes the light modulation member 4. The illumination light constitutes a linear light ray shown by reference number 51. As shown in FIG. 2(a), a mirror 56 in the array, which is ON, initially reflects the illumination light and then, by way of a lens 1, the light is reflected by the galvanometer mirror 5 and led to the sample body 10. At this time, because all other mirrors other than the mirror 56 are in the OFF state, the light reflected by the OFF section is not led to the sample body. Next, as shown in FIG. 2(b), when a mirror 56 is switched OFF a mirror 57 is switched ON, the illumination light is reflected by the mirror 57 and then, by way of the lens 1, is reflected by galvanometer mirror 5 and led to sample body 10. The changeover of the ON position and sequential illumination from the mirror 56 to the mirror 64, as shown in FIGS. 2(a)-2(i) is performed in such a way that the illuminated light appears to be scanned in the X-direction of the DMD. In addition, when the illumination of one line segment on the X-axis has been completed, the galvanometer mirror is then shifted one line in the Y-direction where the further sequential illumination from the mirror 56 to 64 of the DMD is performed, and this is again followed by the shift of galvanometer mirror another line in the Y-direction. Single-point scanning confocal illumination can be performed by the sequential implementation of this operation and illumination to the last line in the Y direction.

The series of cooperative actions is implemented by the control of the computer 90. The computer 90 has the function of a pattern control part for determining the illumination pattern of the line-shaped light as shown in FIGS. 2(a) to 2(i). In addition, the computer 90 comprises a function as a picture forming part whereby, by the accumulation of the acquired line image data correspondent to each illumination pattern in the inner party memory of the computer and the synthesis thereof, it forms one image.

The computer 90, by the acquisition of the shade patterns of the light irradiated on the sample body from the pattern control part for determining the shade patterns of the line-shaped light, and the re-arrangement of this acquired line-shaped data in accordance with the illumination pattern, creates a two-dimensional image of the sample body. More specifically, by way of example, only the line data equivalent to the "bright" section in the shade pattern is adopted as the luminance data for said position, and the line image data when the light has been sequentially irradiated in different shade patterns is processed and rearranged in the same way. Provided the confocal illumination is implemented at all pixel positions on a single section image, one confocal image is formed by the rearrangement of the line image data acquired by this method. Alternatively, without this rearrangement, a two-dimensional confocal image can be formed if the acquired line data for identical lines is added together.

Figure 3A:
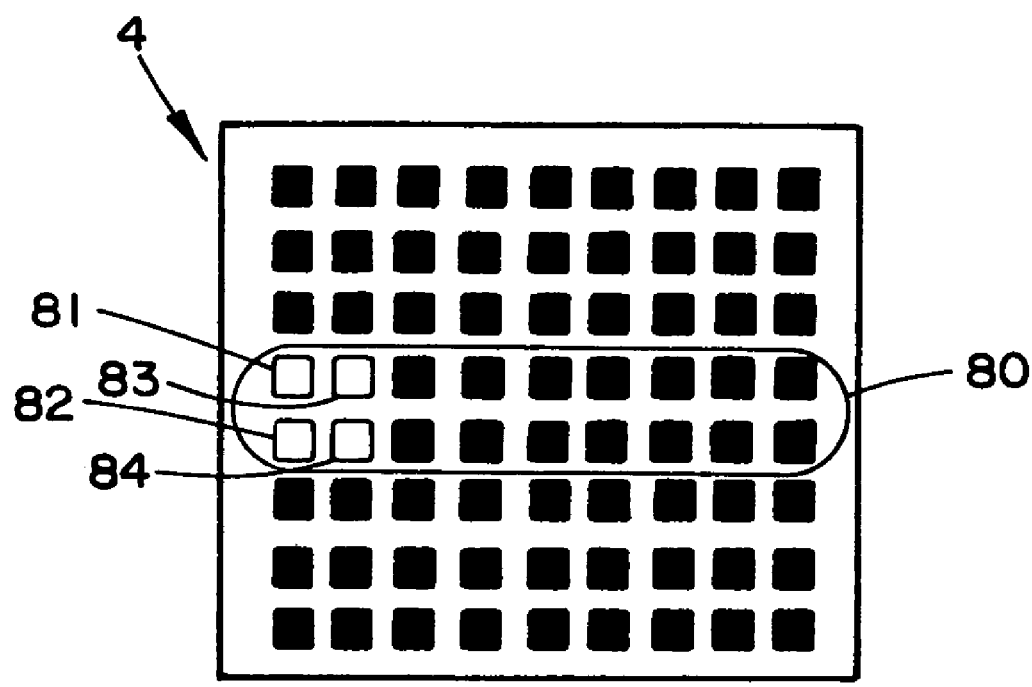
FIGS. 3(a) and 3(b) illustrate a variation of the mirror on/off patterns of FIGS. 2(a)-2(c) where a plurality of adjacent mirrors are switched on and off.
Figure 3B:
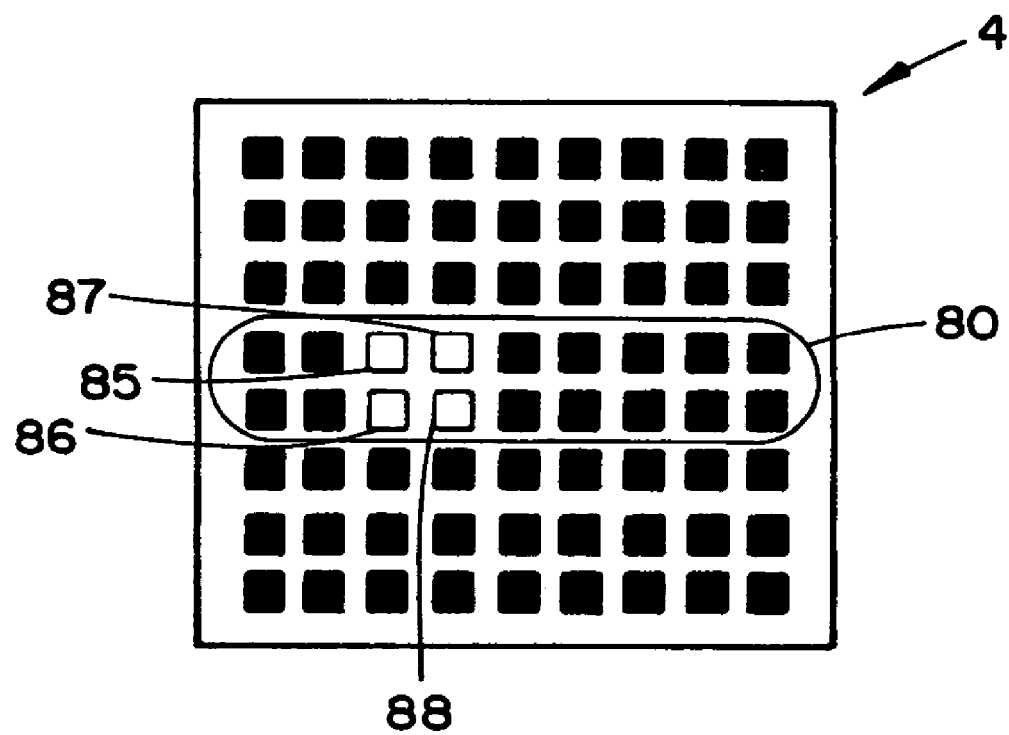

In addition if there is a desire for observation which involves, instead of enlarging the diameter of the confocal aperture which reduces the resolution, the brightening of the brightness, a plurality of adjacent mirrors as shown in FIG. 3(a) are switched ON. By way of example, an effect identical to that obtained when the confocal aperture is opened will be produced if mirrors 81, 82, 83 and 84 are simultaneously switched ON. If the focal distance of the lens 3 is optimized in such a way that the illumination light can be irradiated in a broad range as shown by 80, both the illumination range and light-receiving range can be simultaneously controlled by the light modulation member. In addition, even in a configuration in which the focal distance of the lens 3 is regulated and the illumination range that can be produced constitutes the illumination produced by the stopping of the illumination light as shown by 51 of FIGS. 2(a) to 2(i), because the effect on the observed image is as if the confocal aperture was expanded if the mirrors 81, 82, 83 and 84 are simultaneously switched ON as shown in FIG. 3(a), the image is brightened. For scanning, as shown in FIG. 3(b), the mirrors 81, 82, 83, 84 are switched OFF and the mirrors 85, 86, 87, 88, which constitute an adjacent group, are switched ON. The scanning in the X-direction is constructed similarly to that described with regard to FIGS. 2(a)-2(c) and implemented by the sequential switching ON of the plurality of adjacent mirrors in this way. By implementation of the scanning in this way, an identical effect to that achieved when the confocal aperture is expanded can be produced and a bright image can be produced.

Figure 4A:
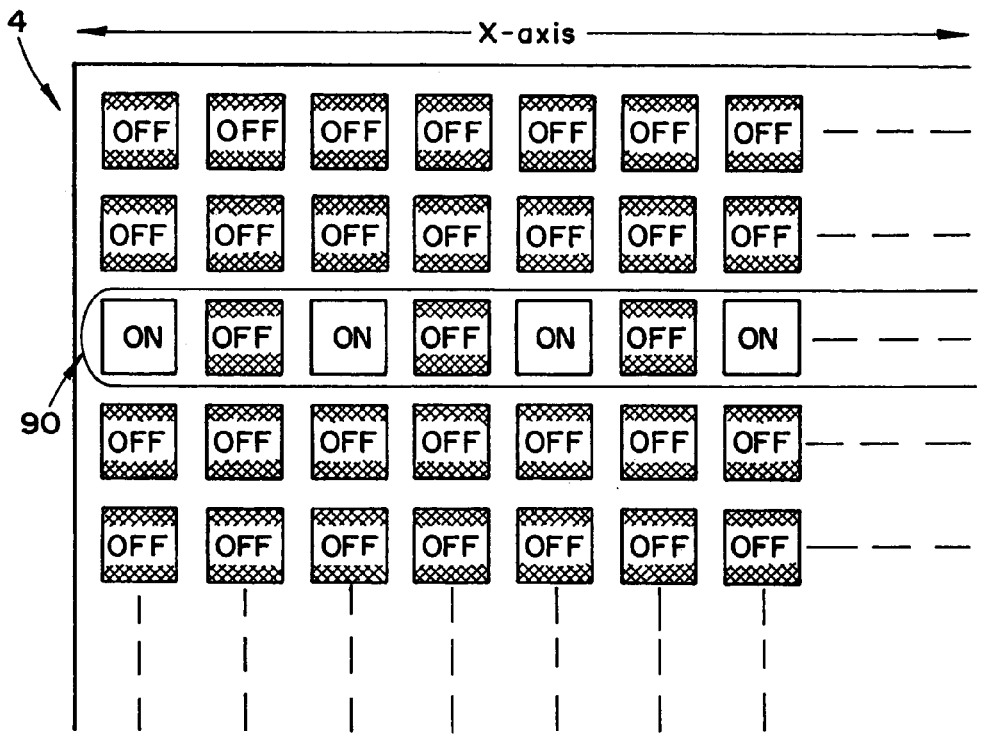
FIGS. 4(a) and 4(b) illustrate mirror on/off patterns for the light modulator member in which linear illumination light is irradiated on a section in which a plurality of mirrors is alternately switched ON and OFF.
Figure 4B:
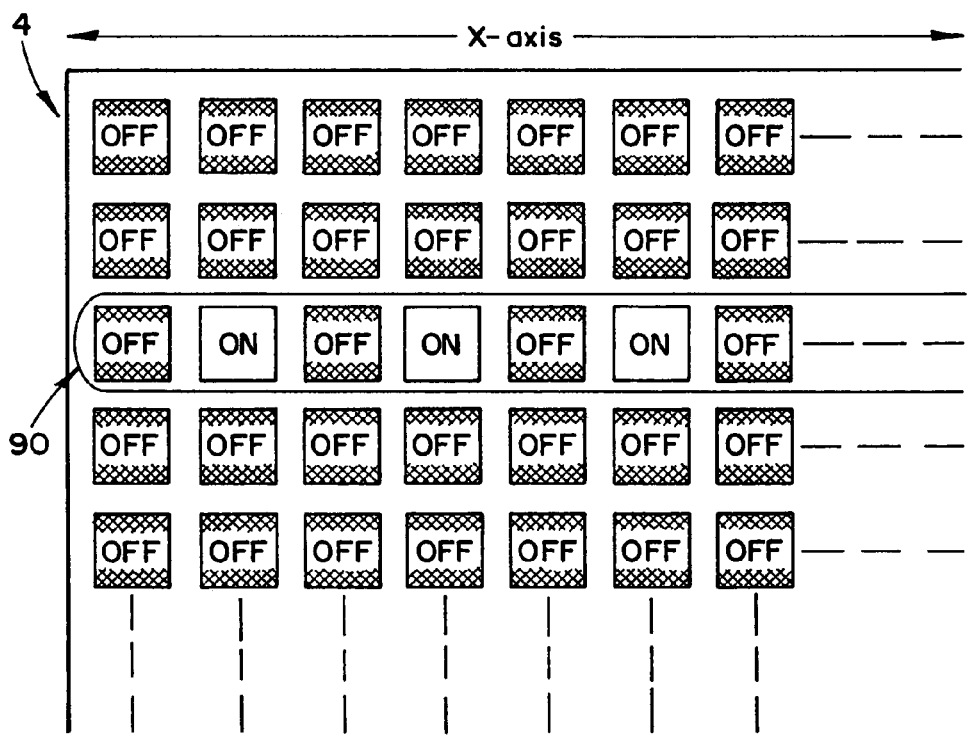

A description is given below of a method for the illumination of a sample body at a plurality of points by the imparting of shade to a linear illumination light. The description in this case is also given with reference to the first embodiment. The illumination light is illuminated by the lens 2 on to a DMD that constitutes a light modulation member 4. Furthermore, one part of the DMD is shown in FIGS. 4(a)-4(b). The illumination light constitutes a linear light ray as shown by reference number 90 of FIGS. 4(a)-(b). The linear illumination light is irradiated on a section in which a plurality of mirrors is alternately switched ON and OFF as shown in FIG. 4(a). The illumination light is converted to a dot light from linear light by the plurality of mirrors. Next, the dot light is projected on to the sample body surface. Furthermore, the illumination light is illuminated across the whole of the observation range of the sample body 10 by a scanning of the galvanometer mirror 5 correspondent with the Y-axis. The light that is reflected or converted to fluorescence by the sample body 10 is reflected again by the galvanometer mirror 5, transmitted through the lens 1, and imaged on the DMD light modulation member 4. The plurality of mirrors in the ON state on the DMD fulfills the role of the confocal aperture. The light that is transmitted through the plurality of mirrors in the ON state is imaged on the photo detector 12. This image is sent to the memory of the computer 90 as a first set of image data. Next, linear illumination light is irradiated on to a plurality of mirrors set in a reverse pattern to the ON and OFF pattern as shown in FIG. 4 (*a*). This DMD state is shown in FIG. 4(*b*). When the illumination light is irradiated on to the plurality of mirrors for which the OFF and ON has been alternately set, the illumination light is converted from a linear light to a dot shaped by the plurality of mirrors. The dot light is projected onto the sample body surface. When the DMD mirrors are set as shown in FIG. 4(*a*) the dot illumination light is illuminated on to the sample body as dot rays in which the illumination has been reversed. Furthermore, light is illuminated across the whole of the observation range of the sample body 10 by the scanning of the galvanometer mirror 5 correspondent with the Y-axis. The light reflected or converted to fluorescence by the sample body 10 is reflected again by the galvanometer mirror 5, transmitted through the lens 1, and imaged on the DMD light modulation member 4. The plurality of mirrors in the ON state on the DMD fulfills the role of the confocal aperture. The light that has been transmitted through the plurality of mirrors in the ON state is imaged on to the photo detector 12. This imaged image is sent as a second set of image data to the memory of the computer 90. The first and second sets of image data are synthesized by the computer 90 to produce a final picture image.

Figure 5A:
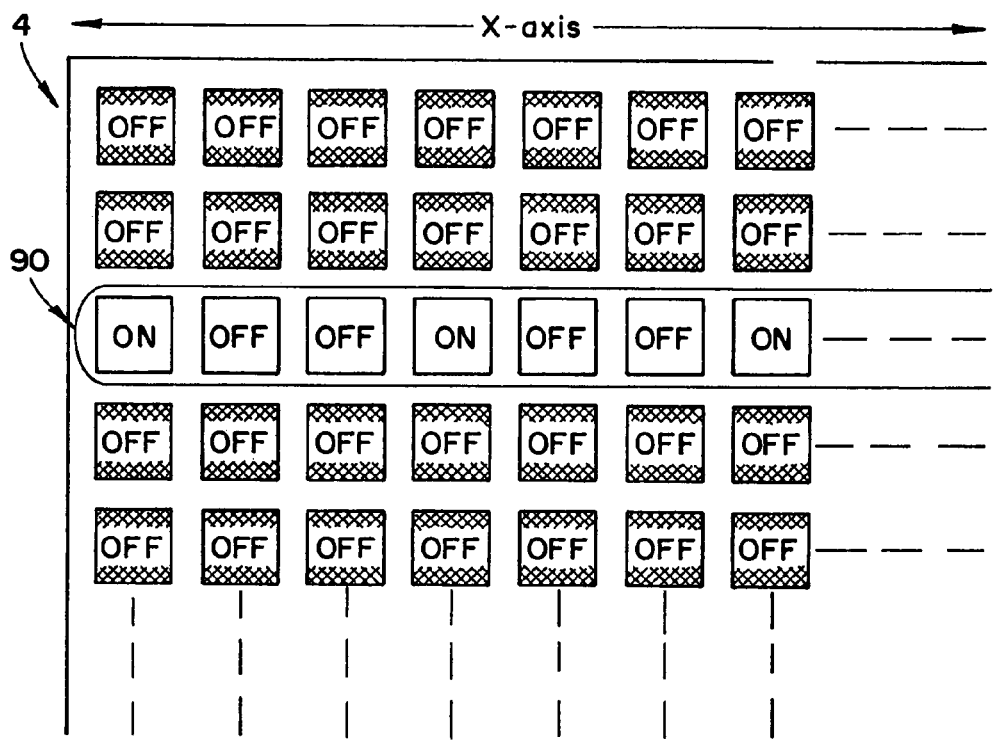
FIGS. 5(a)-5(c) and FIG. 6 illustrate another sequence of on/off patterns of mirrors of the light modulation member.
Figure 5B:
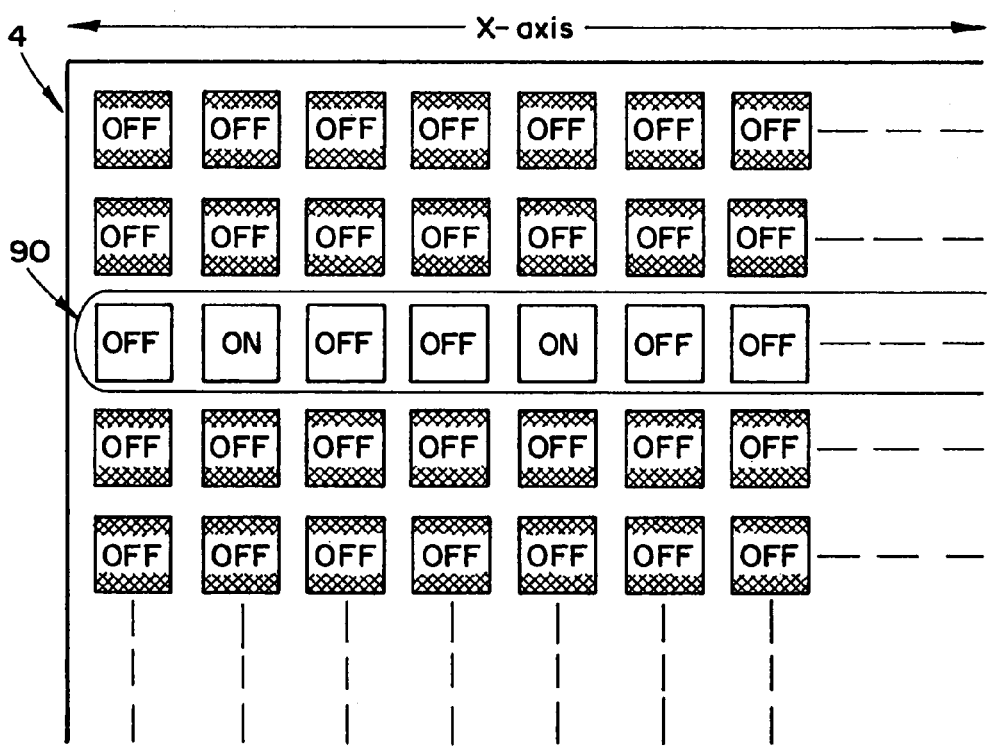
Figure 5C:
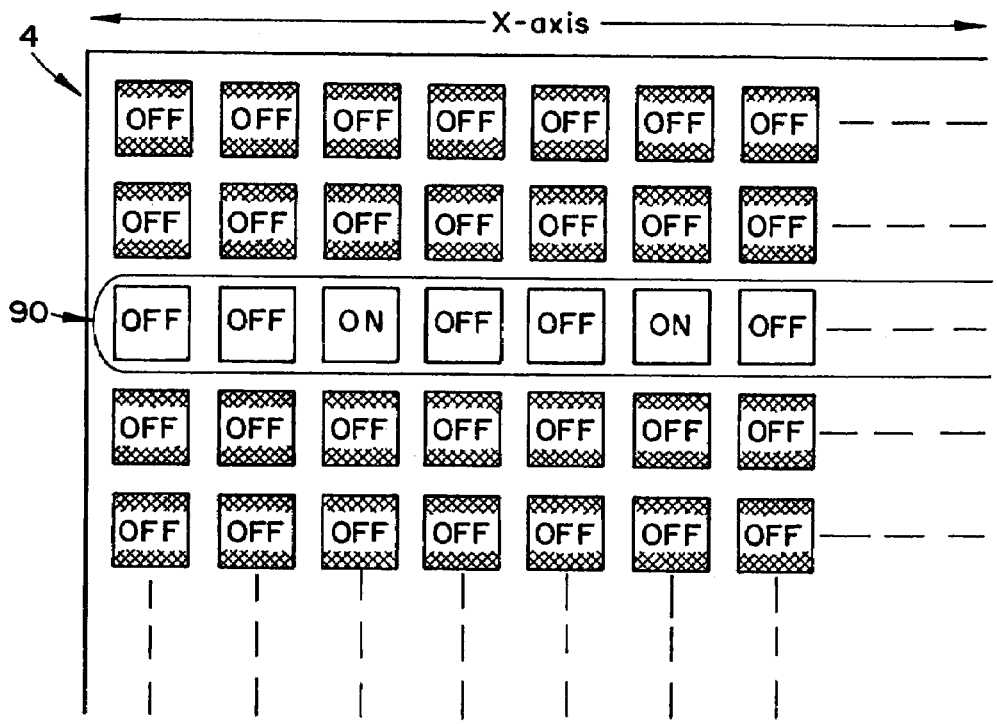

In addition, if a desire exists for the images to be acquired at higher speed than for single-point scanning and, because scattering exists in the sample body and a desire exists to reduce the deterioration of the image due to this scattering, the interval between the ON and ON of the DMD can be increased in multi-point scanning. The setting of the DMD in this case is shown in FIGS. 5(*a*)-5(*c*). In this case, by way of example, the switch for the DMD is set so that a plurality of OFF mirrors, that is, ON, OFF, OFF, ON, exist between the ON mirrors. The number of OFF mirrors to be set between one ON mirror and the next ON mirror is determined by the thickness of the sample and the amount of scattering. For a sample body in which there is a large amount of scattering, it is desirable that a large number of OFF mirrors be provided between one ON mirror and the next ON mirror. First, as shown in FIG. 5(*a*), a repeating pattern of ON, OFF, OFF mirror is set and the sample body 10 is scanned by the galvanometer mirror 5 to produce a first image data set from the photo detector 12. Next, as shown in FIG. 5(*b*), a repeating pattern of OFF, ON, OFF mirrors is set and the sample body 10 is scanned by the galvanometer mirror 5 to produce a second image data set from the photo detector 12. Furthermore, as shown in FIG. 5(*c*), a repeating pattern of ON, OFF, OFF is set and the sample body 10 is scanned by the galvanometer mirror 5 to produce a third image data set from the imaging device 12. Using the computer 90, the first, second and third image data sets are synthesized to produce a final picture image data.

Figure 6:
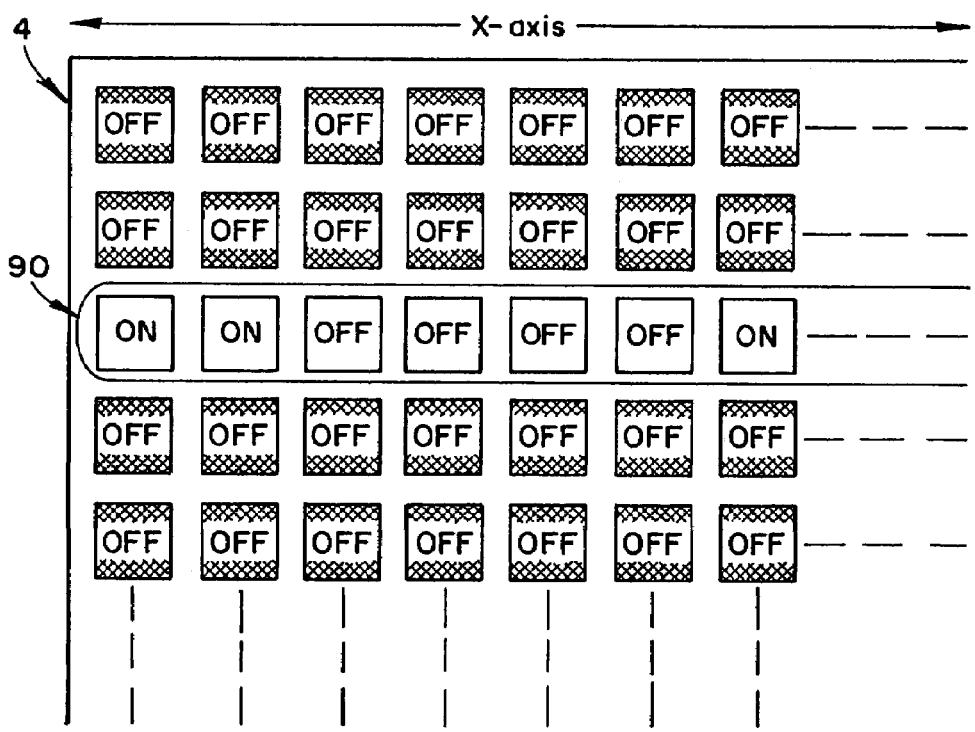

In addition, if a desire exists for the pictures to be taken at higher speed than for single-point scanning and, because scattering exists in the sample body and there is a desire to reduce the deterioration of the image due to this scattering and to simultaneously brighten the image, a plurality of OFF mirrors can be provided in multi-point scanning between one ON mirror and the next ON mirror of the DMD 4 and, as far as the ON mirror itself is concerned, a plurality of continuous ON mirrors can be set. This example is shown in FIG. 6. The setting of the mirrors in FIG. 6 is ON, ON, OFF, OFF, OFF, OFF. By the adoption of this setting the brightness and contrast of the image can be increased and the image can be produced at comparatively high speed.

Figure 7A:
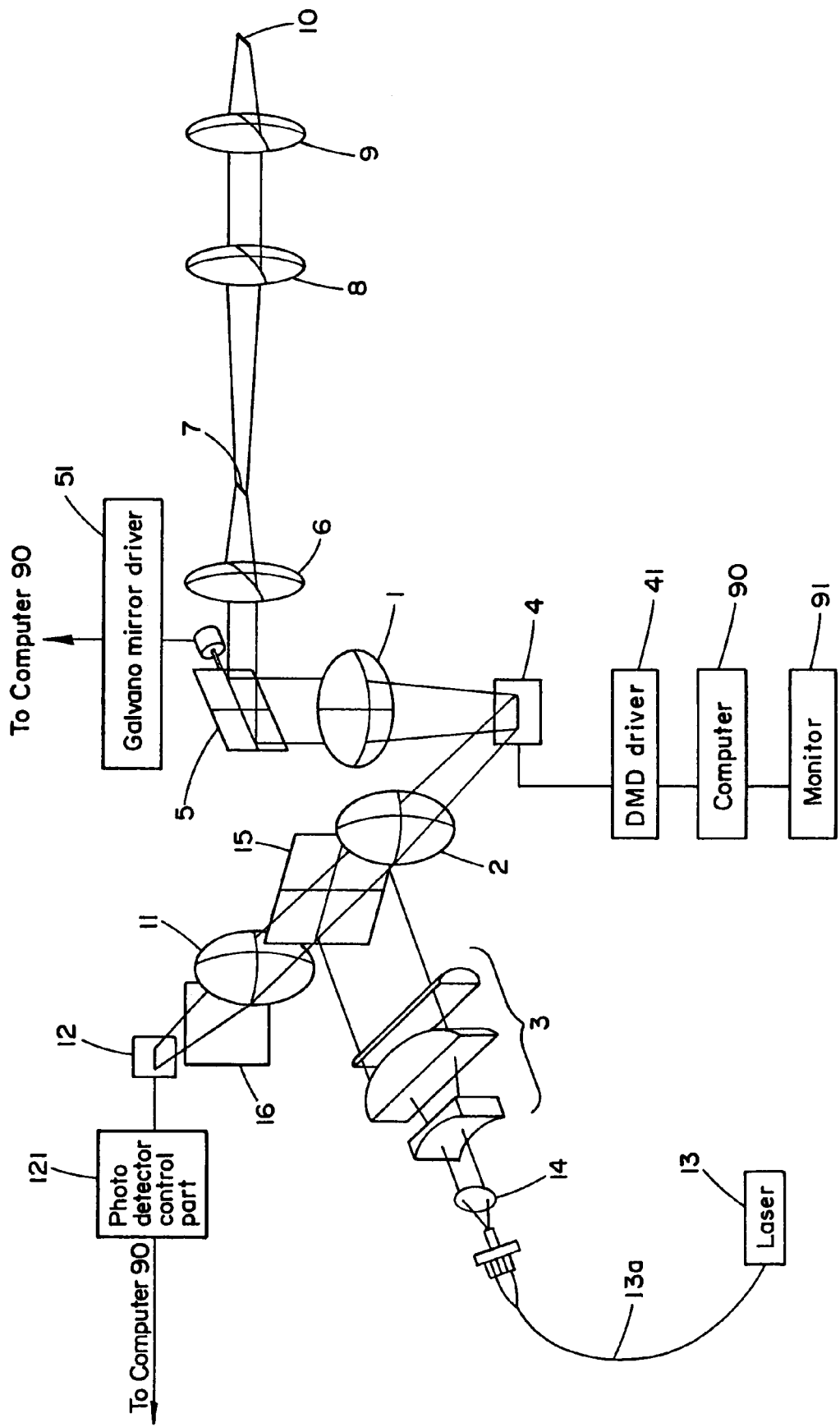
FIGS. 7(a) and 7(b) illustrate a variation of the optical system of FIGS. 1(a) and 1(b), respectively.
Figure 7B:
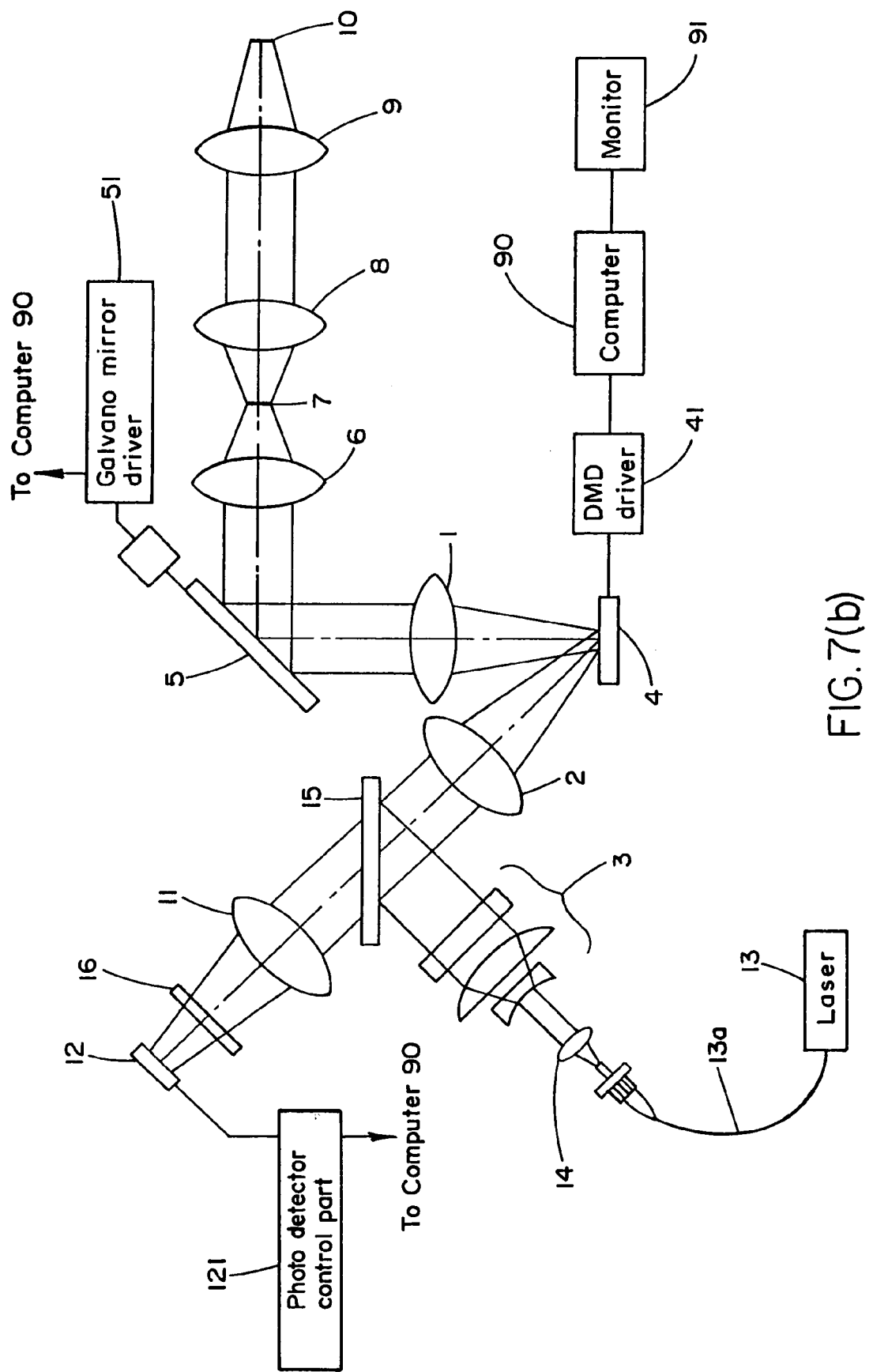

In addition, a description is given below, with reference to FIG. 7(*a*)-FIG. 7(*b*), of the acquiring of the images of a spectral picture image using the device of the first embodiment. In FIG. 7(*a*)-FIG. 7*b*), in addition to the imaging device 12 of the confocal microscope of the configuration identical to that of FIG. 1, a two-dimensional detector, by way of example, a CCD camera, is employed, and a spectral element 16, by way of example, a diffraction or Acousto-Optic Modulator (AOM), is provided between the photo detector 12 and the light modulation member 4.

The spectral element 16 is arranged in such a way that spectral diffraction of the linear (dot ray) light that falls incident on the spectral element 16 occurs in the direction orthogonal to the direction of the rays.

Figure 8:
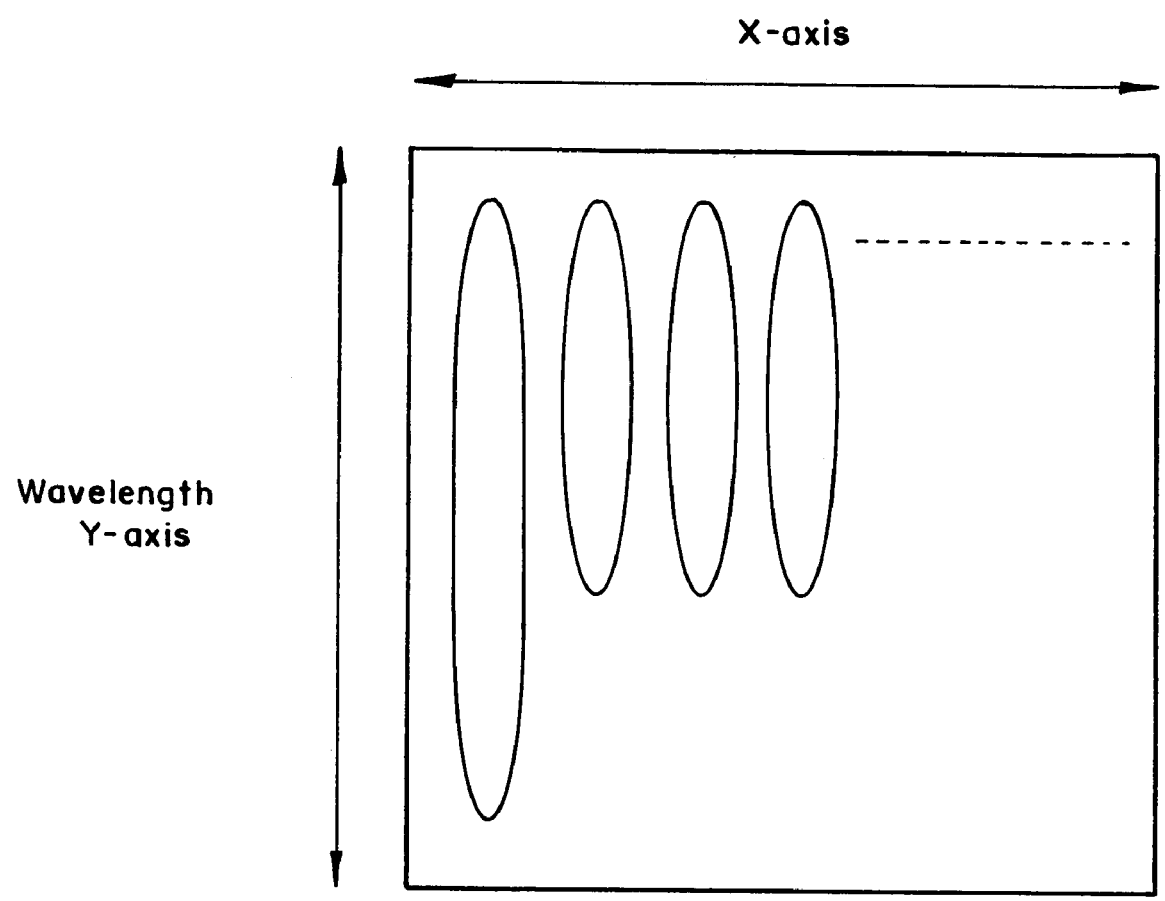
FIG. 8 illustrates an example of a spectrum for a case in which the sample body has been illuminated by an illumination light possessing shade.

If a diffraction element is employed as the spectral element 16, changeover from the spectral confocal microscope to a normal confocal microscope can be achieved by the operation of the provision and removal of the element in the optical path. In addition, if an Acousto-Optic modulator is employed, use as a spectral confocal microscope is possible if the Acousto-Optic element is switched ON and, if the element is switched OFF, a changeover to a normal confocal microscope is possible. FIG. 8 represents an example of a spectrum for a case in which the sample body has been illuminated by an illumination light possessing shade. The X-axis direction of the image photographed by the photo detector 12 (CCD camera) is correspondent to the pixel position in the X-direction and the Y-axis direction thereof corresponds to the wavelength. The luminance of the pixels in the image expresses the strength of the light for each wavelength in the pixel position in the X-direction.

Not only a point source such as a laser but also a so-called white light source, for example, a mercury or xenon lamp or halogen lamp, can be employed in this optical system. In this case there are no limitations to the wavelength that can be illuminated on the sample body. This is particularly effective if the present invention is employed as a fluorescence microscope because excitation at a variety of wavelengths is possible.

Figure 9:
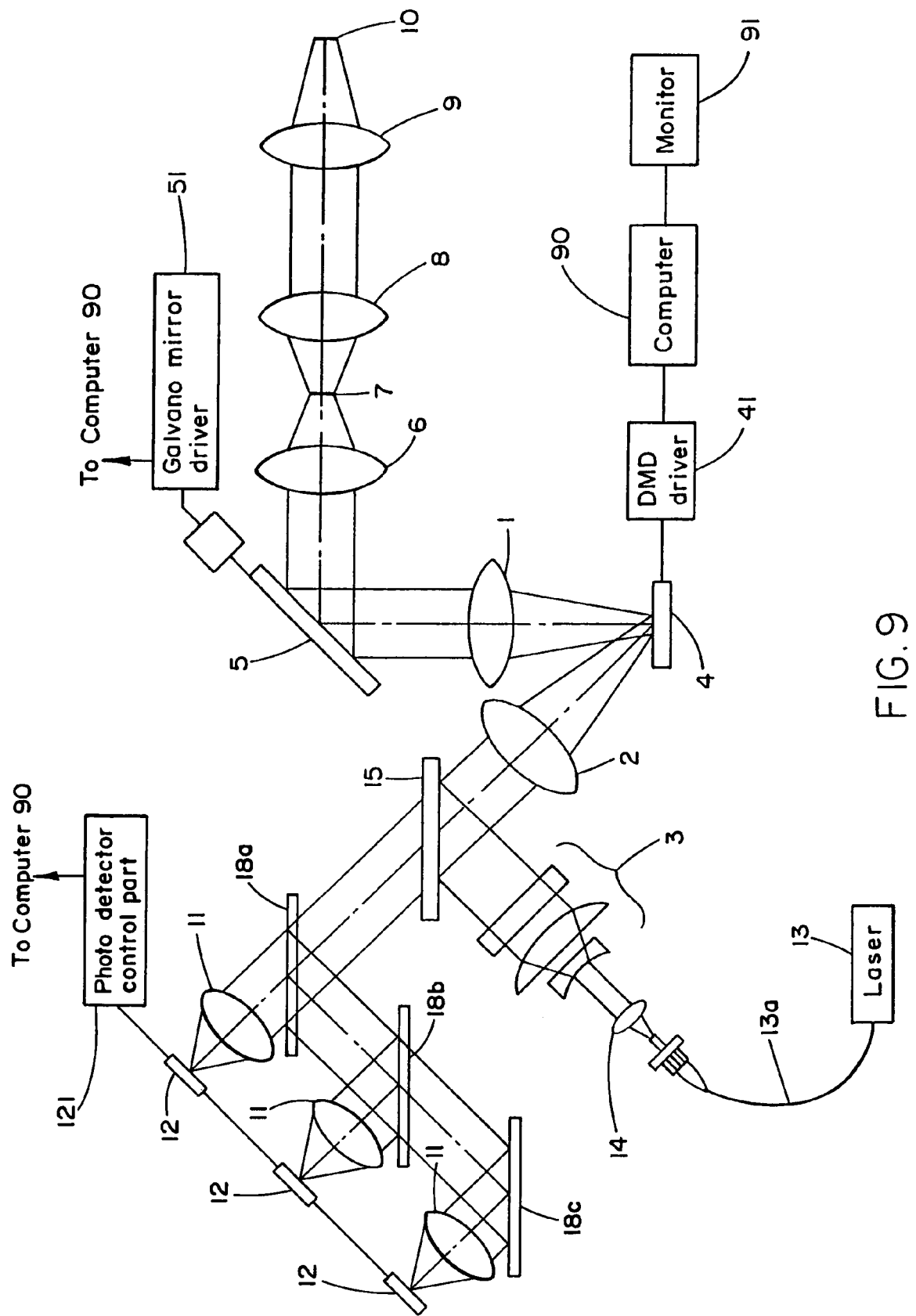
FIG. 9 illustrates a device in which a plurality of photo detectors are employed, and in which light from a sample body is separated for each wavelength by dichroic mirrors so that the light of these respective wavelengths can be simultaneously photographed.

Referring now to FIG. 9, there are shown a device in which a plurality of photo detectors are employed, the light from the sample body is separated for each wavelength by dichroic mirrors 18*a* to 18*c* so that the light of these respective wavelengths can be simultaneously photographed.

Figure 10:
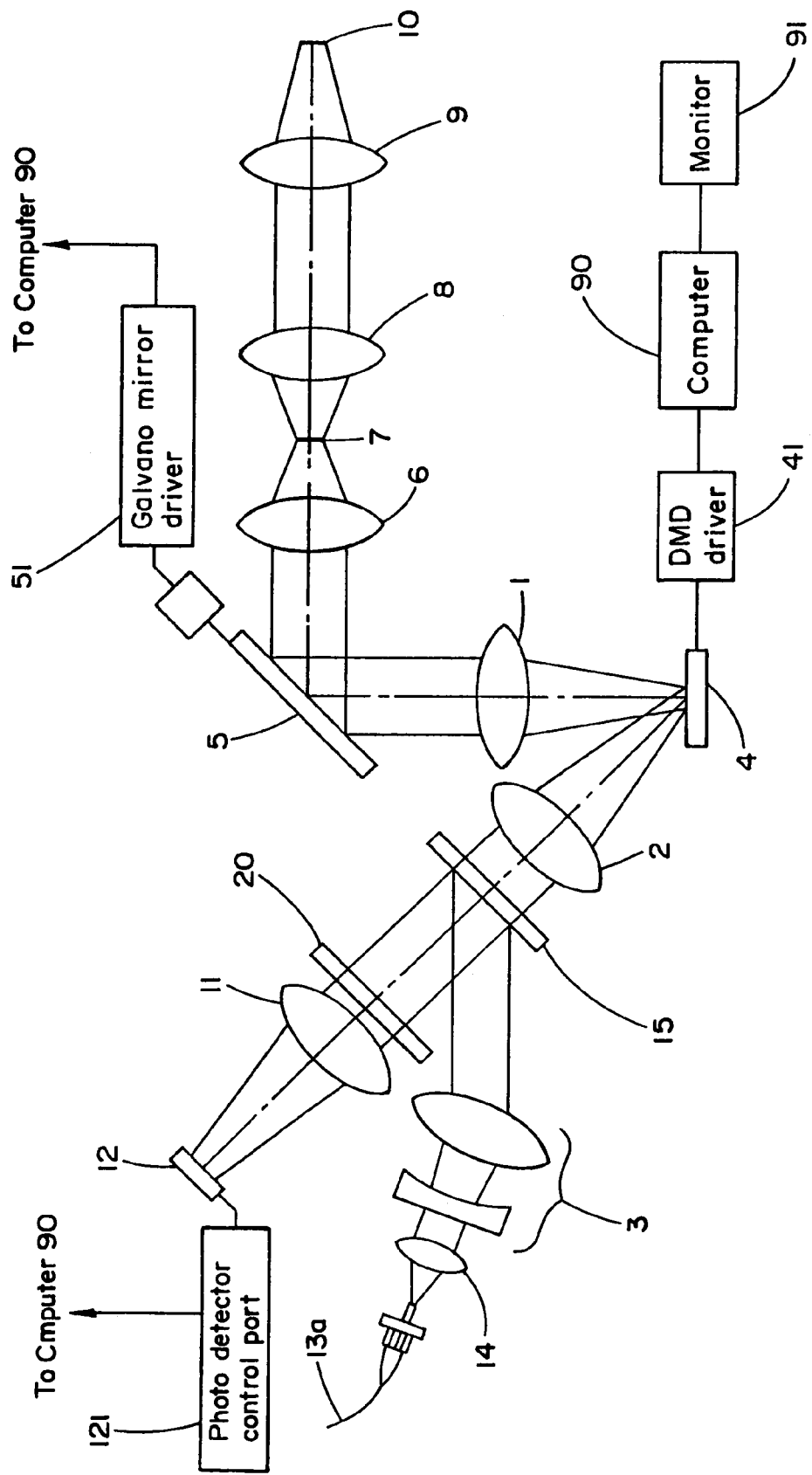
FIG. 10 illustrates a configuration in which a diffraction optical element is employed such that the optical path of the excitation light only is refracted causing the illumination light to fall incident from the lateral direction.

Referring now to FIG. 10, there is shown a configuration in which a diffraction optical element 20, by way of example, a holographic notch filter or Acousto-Optic Modulator is employed, the optical path of the excitation light only is refracted causing the illumination light to fall incident from the lateral direction. If a configuration such as this is adopted, all wavelengths other than that of the excitation light can be led to the photo detector 12 whereby the illumination can be achieved with higher efficiency than is obtainable with the dichroic mirrors (see 18(*a-c*) in FIG. 9) and the sample body with litter Strokes shift can be observed.

Figure 11:
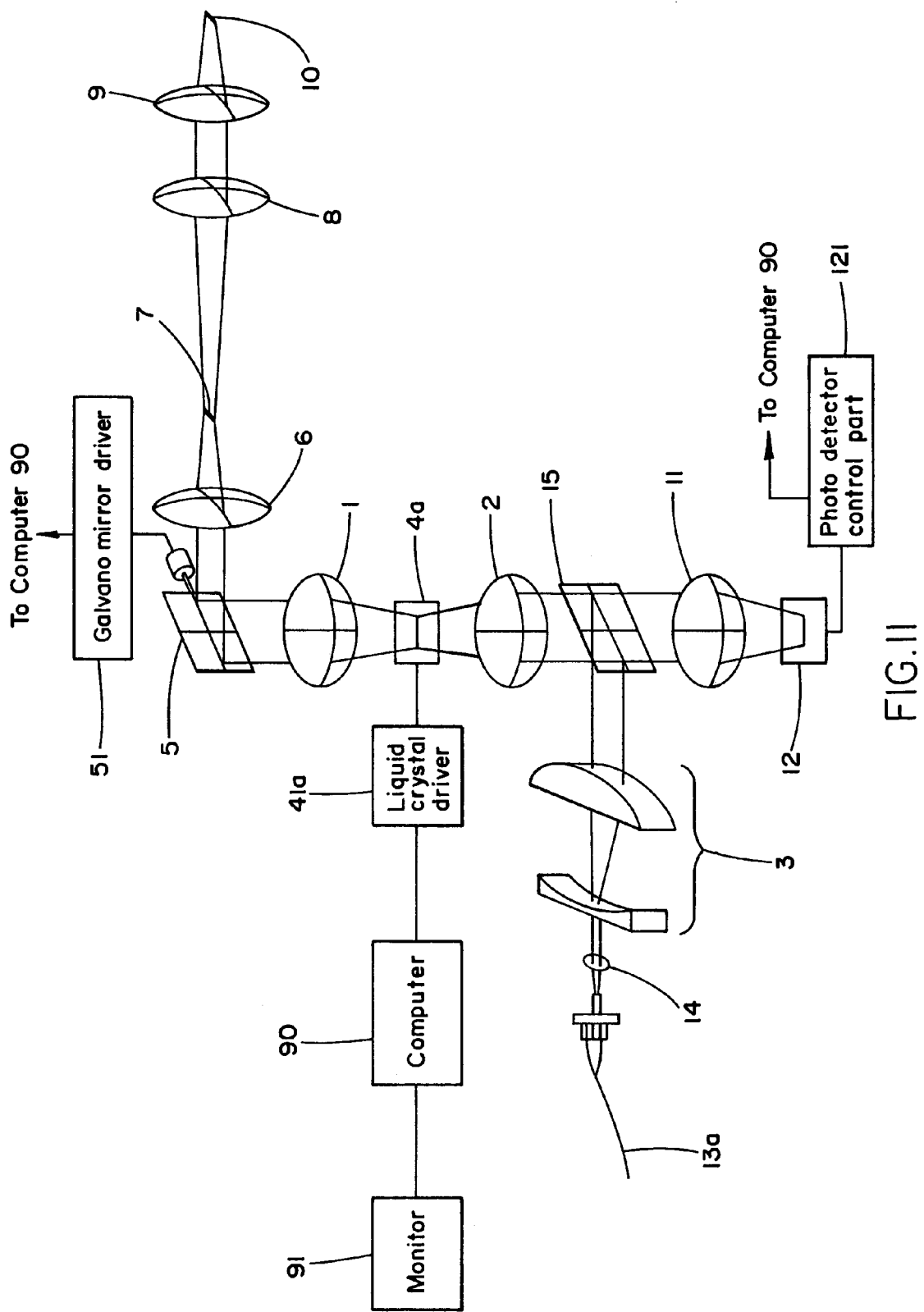
FIG. 11 illustrates an optical system configured with a liquid crystal diaphragm in place of the light modulation member.

FIG. 11 shows an example configured from a liquid crystal diaphragm 4*a* in which no DMD is employed. This liquid crystal diaphragm 4*a*, driven by liquid crystal driver 41*a* in the same way as the DMD implements a changeover control involving the transmission (ON) or non-transmission (OFF) of the light that falls incident based on a unit size of the order of the resolution limit. By virtue of this, the liquid crystal diaphragm fulfills a function of modulating the light strength of the linear light. In the same way as the system of the first embodiment, the galvanometer mirror and photo detector are linked and controlled by the computer 90.

Figure 12:
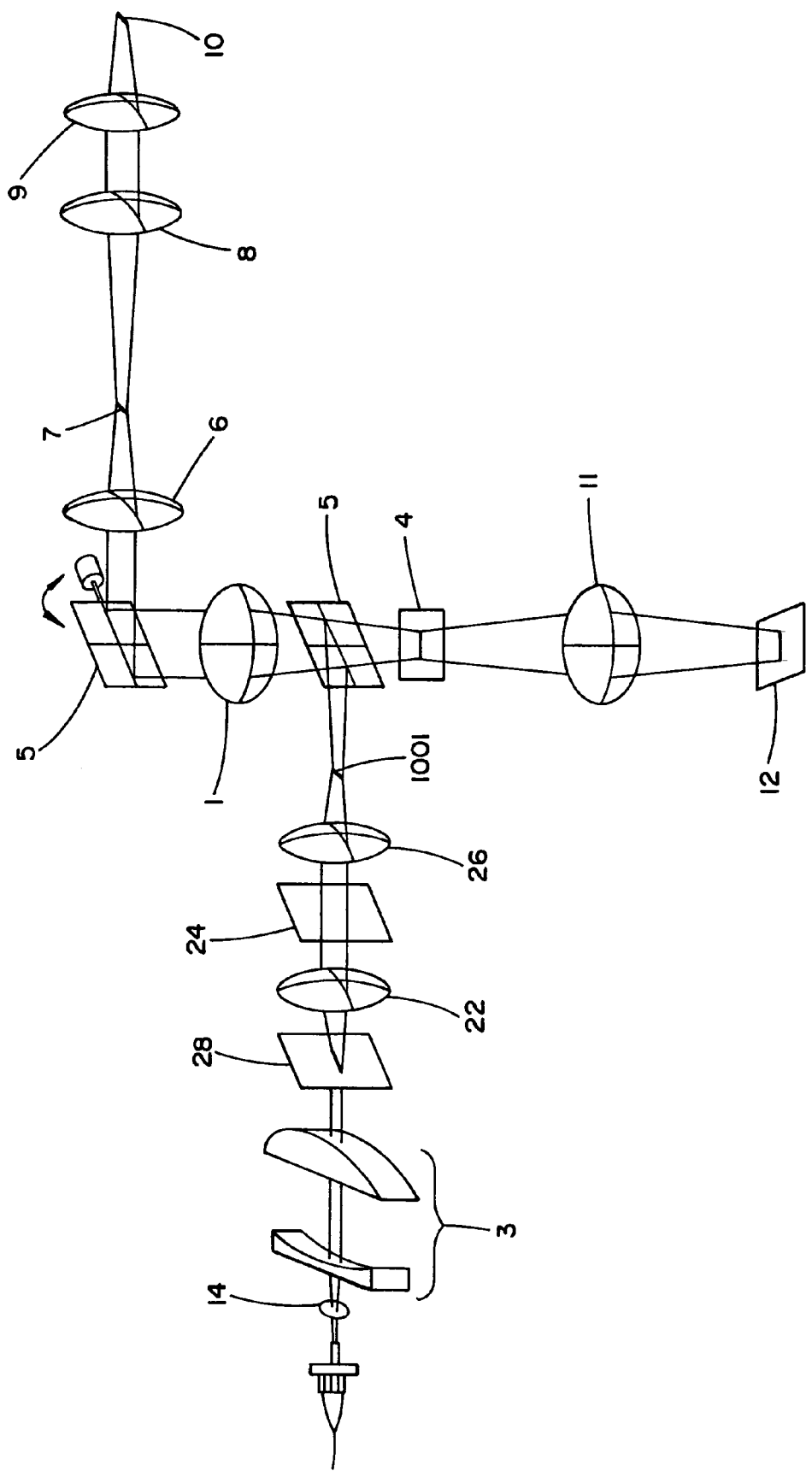
FIG. 12 illustrates an optical system in which fringes are formed are projected on the sample body by the provision in the illumination light of a diffraction grating.
Figure 13A:
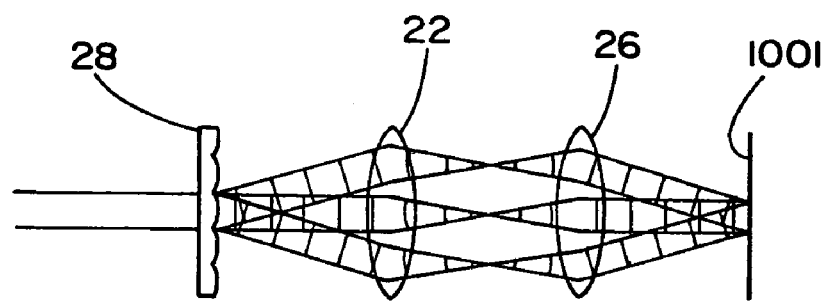
FIGS. 13(a)-(c) illustrate the diffraction grating, lens and liquid crystal shutter of the system of FIG. 12.
Figure 13B:
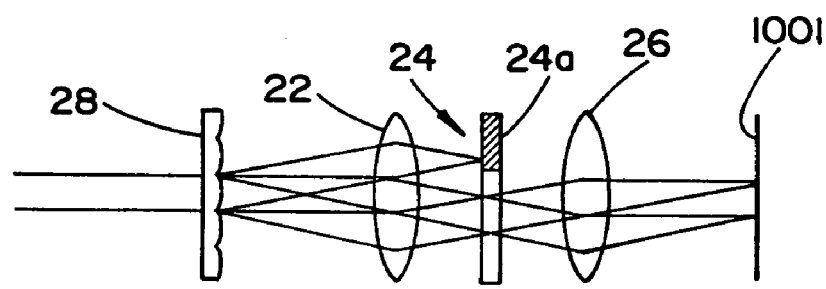
Figure 13C:
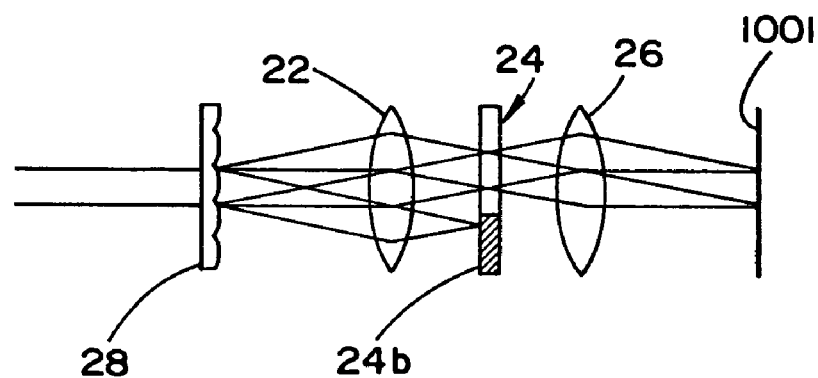

FIG. 12 shows an example in which fringes are formed and projected on the sample body by the provision in the illumination light of a diffraction grating, the single refraction of the illumination light, and the obstruction of the +1 diffraction beam or −1 diffraction beam of the diffracted light. Because the fringes are displaced if the +1 diffraction beam or −1 diffraction beam are obstructed, a description will be given of the principles thereof with reference to FIGS. 13(a)-13(c), 20(2), 20(b), and 21. If this illumination method is employed, a confocal effect can be produced in the X-direction of the image by the employment of a light modulation member such as a DMD and, as disclosed in U.S. Pat. No. 6,376,818, a confocal effect can be produced in the Y-direction of the image by the projection of these fringes. FIGS. 13(a)-(c) illustrate the diffraction grating 28, lenses 22, 26, and the liquid crystal shutter 24 of FIG. 12 in detail.

Figure 20A:
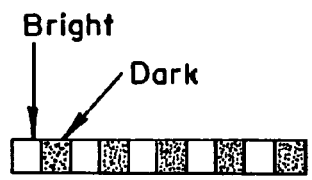
FIGS. 20(a) and 20(b) illustrate the projected pattern produced by the optical elements of FIGS. 13(b) and 13(c), respectively.
Figure 20B:
Figure 21:
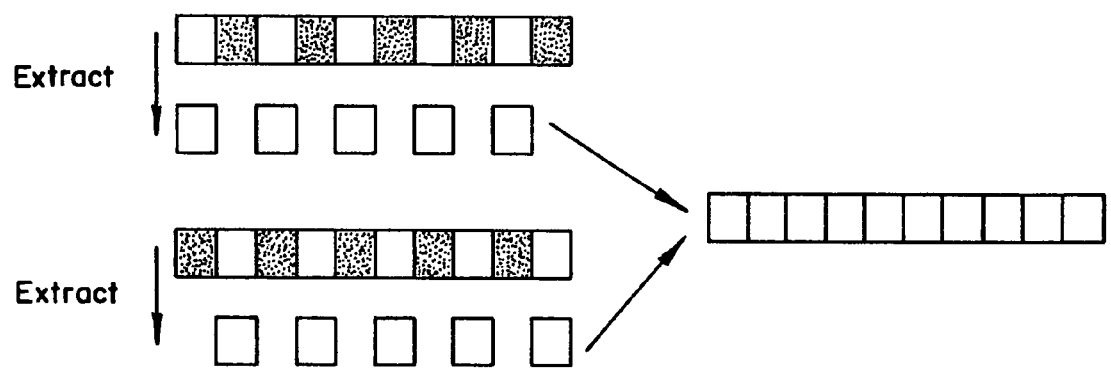
FIG. 21 illustrates the combination of the bright regions of each of the patterns of FIGS. 13(b) and 13(c).

The embodiment shown in FIG. 12 uses structural illumination and illustrates the elements that obtain a confocal image. As shown in FIGS. 13(a)-(c) the laser light is incident upon the diffraction grating 28 and two or more diffraction lights are generated and incident upon the lens 22. The lens 22 makes each diffraction light condense to a linear spot. FIG. 13(a) illustrates the condensed beams being focused on plane 1001 with lens 26. To generate a striped pattern on plane 1001, phase at a black marked portion 24a of the phase plate 24 is shifted by ¼ wavelength from the rest of the phase plate 24, as shown in FIG. 13(b). Next, phase at the black marked portion 24b of the phase plate 24 is shifted by ¼ wavelength from the rest of the phase plate 24, as shown in FIG. 13(c). In the case of FIG. 13(b), a projected pattern on plane 1001 is shown in FIG. 20(b). In the case of FIG. 13(c), a projected pattern on plane 1001 is shown in FIG. 20(c). A single line image is obtained by composing the two patterns shown in FIGS. 20(b) and 20(c). Bright regions of each of the images of FIGS. 20(a) and 20(b) are combined into the one line image as shown in FIG. 21.

In addition, in order to detect a bright image using this optical system, the system must be able to accommodate objective lens of large pupil diameter. Although the objective lens backside NA in the light ray ejection for the imaging of a sample body in hitherto employed microscopes is of the order of 0.03, to be able to observe a bright image across a wide range, the system must be able to accommodate NA values of between 0.04 to 0.1 or greater, by way of example, a value of 0.175. In an optical system comprising a pupil of large diameter such as this, a large diameter galvanometer mirror must be adopted. The driving of a galvanometer mirror of large diameter such as this at high speed is difficult. Although, in order to take an image of resolution 512×512 using the confocal microscopes of the prior art in which scanning is implemented using a galvanometer mirror, at least the X-scanning galvanometer mirror must be shaken 512 times, because an X-scanning galvanometer mirror is unnecessary in the confocal microscope of this configuration and the Y-scanning galvanometer mirror need be shaken only once, pictures of the image can be taken at high speed even if a comparatively large galvanometer mirror is used.

Figure 14:
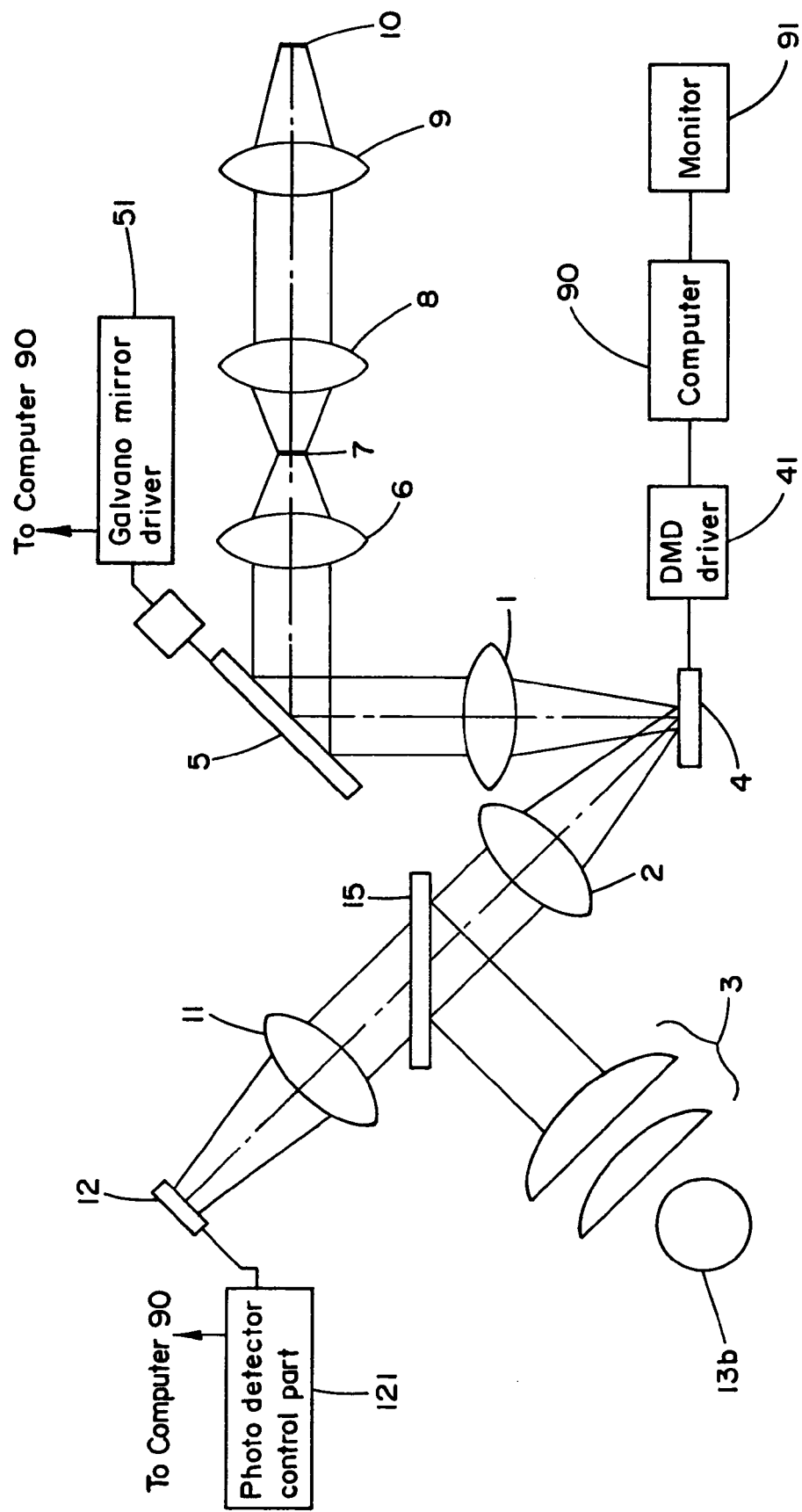
FIG. 14 illustrates an optical system using a white light source such as a high-pressure mercury lamp, xenon lamp, halogen lamp or metal halide lamp as the illumination light source.

FIG. 14 illustrates an optical system for using a white light source 13b such as a high-pressure mercury lamp, xenon lamp, halogen lamp or metal halide lamp as the illumination light source. In such an optical system, lens 3 is optimized for the white light source 13b. The light source 13b is preferably a high-pressure mercury lamp, however, a xenon lamp, halogen lamp or metal halide lamp can also be utilized.

Figure 15:
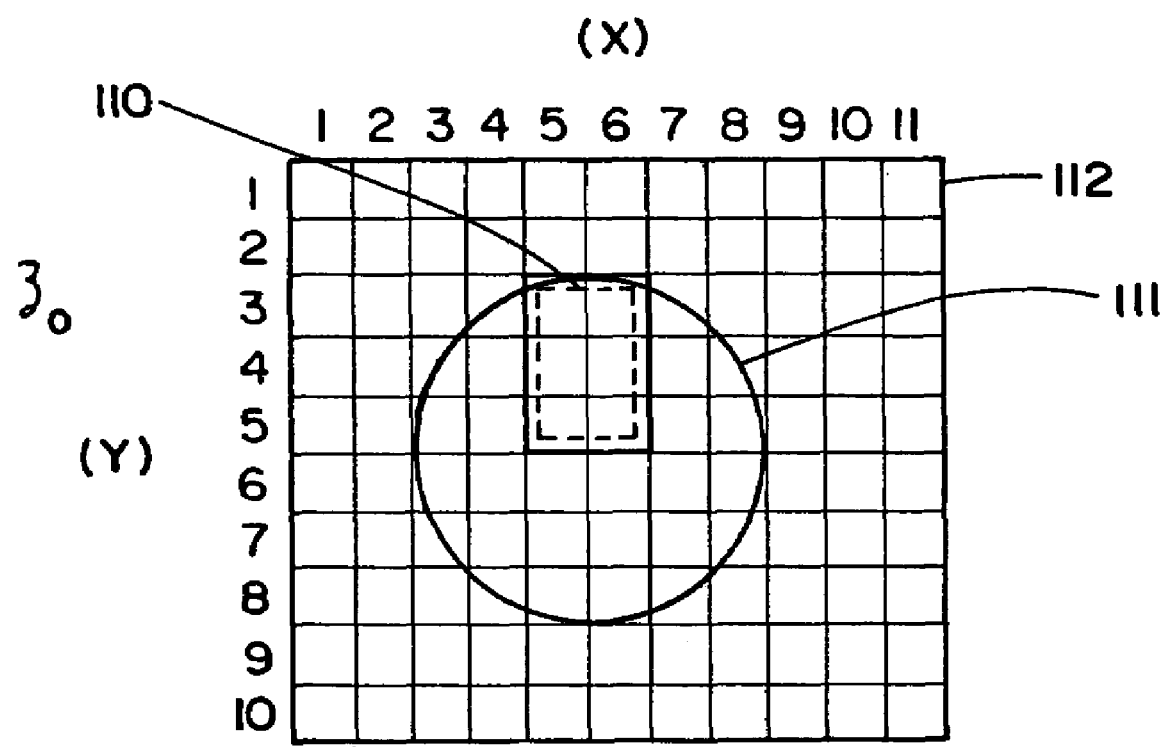
FIG. 15 illustrates pixels that correspond to cells on a sample body and the range across which the taking of pictures is possible.

An explanation is given below with reference to FIG. 15. If the ON and OFF of the optical modulation member and the phase of the galvanometer mirror are properly used, the light can be irradiated on specified positions on the surface of the sample only. A description is given below of the means employed for this. FIG. 15 shows pixels that correspond to cells 111 on the sample body and the range 112 across which the taking of pictures is possible. Here, a description is given of a method for observing a fluorescence image in which light is irradiated on to one part 110 of these cells.

1. The illumination light is set at the desired illumination wavelength.

2. All mirrors of the DMD element, which constitute the light modulation member 4 and which correspond to X1 to X11 in the Y1 line, are switch OFF.

3. The galvanometer mirror 5, for which alteration of the illumination position in the Y-axis can be performed, is moved from a position in which Y1 can be illuminated to a position in which Y3 can be illuminated.

4. Light is irradiated by the switching ON of the DMD mirrors corresponding to the illuminated position X5, X6 of the line Y3 only.

5. The galvanometer mirror 5 is moved, X5, X6 of the line Y4 are illuminated, then X5, X6 of the line Y5 are illuminated.

6. The DMD 4 correspondent to the X5, X6 position of the line Y5 is changed over to OFF, then the galvanometer mirror, by way of the position Y6, is shifted to the position Y10.

7. If there is a desire for the scanning to be implemented several times, the operations from 2 to 6 can be repeated.

8. The acquiring of the fluorescence image is initiated.

Figure 16:
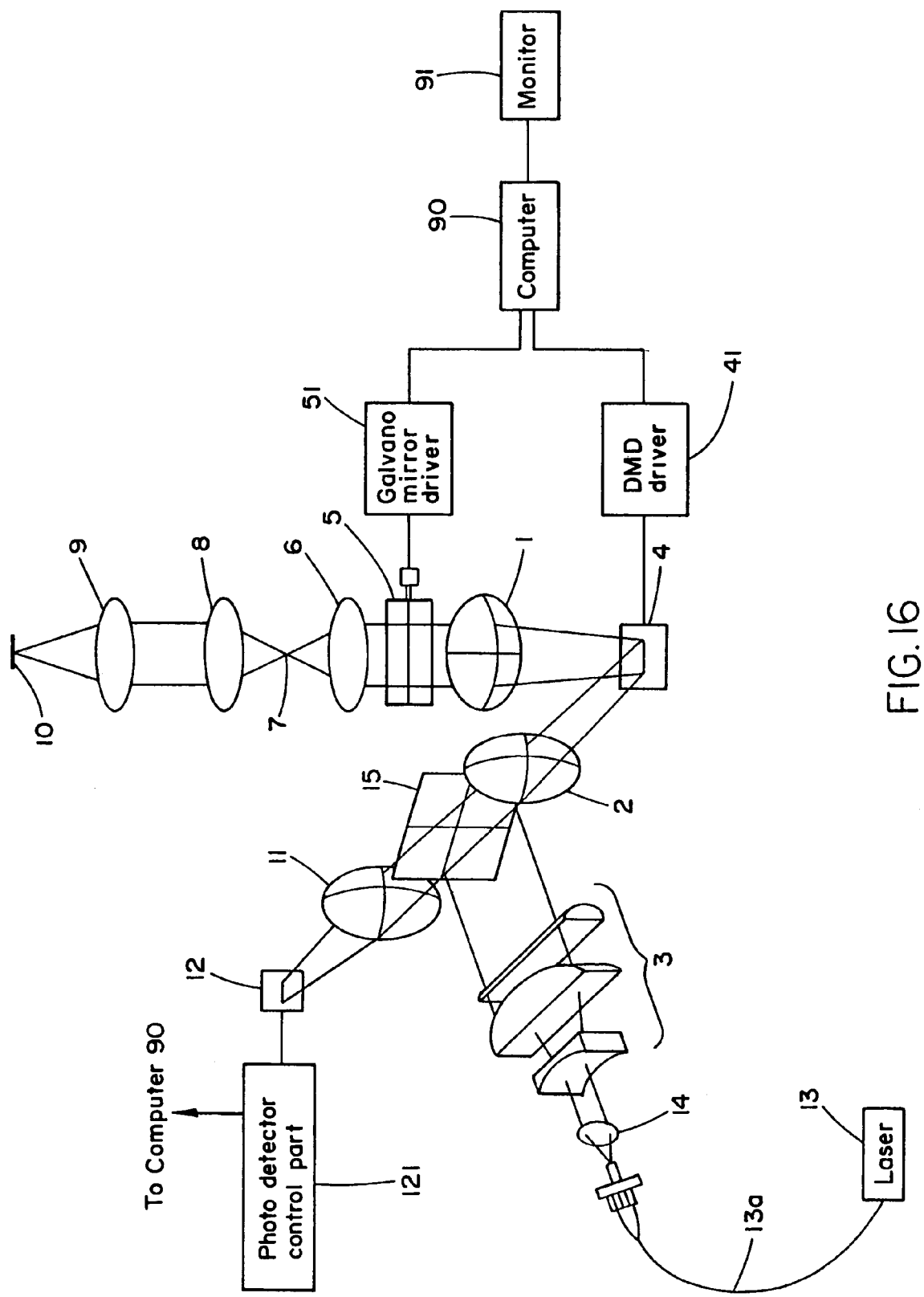
FIG. 16 illustrates an optical system having a one-dimensional Digital Mirror Device array, in which mirrors are arranged in a line in the light modulation member 4 and wherein the optical path bends upward for the galvanometer mirror.

A description is given below with reference to FIG. 16. FIG. 16 shows an example in which a one-dimensional Digital Mirror Device array, in which mirrors are arranged in a line in the light modulation member 4, is employed. The configuration adopted in this embodiment is one in which the optical path is caused to bend upward from the galvanometer mirror 5. Although not shown in the configurations of the embodiment of FIG. 1, FIG. 7, FIG. 10, FIG. 11, FIG. 12 and FIG. 14, the adoption of a configuration in which the optical part bends upward from the galvanometer mirror 5 is also possible in these embodiments. As the photo detector 12 of FIG. 16, a line sensor is employed. In the confocal observation of all the embodiments, a line, dot or dot ray is projected on to the photo detector 12.

Referring now to FIG. 17, by splitting of the light led from the sample body 10 by a dichroic mirror 151, passing the split light through band pass filters 152, 155 through which the respective lights of different wavelength are transmitted and, furthermore, the reflection by mirrors 153, 154, and 156 and the imaging by imaging lens 158, 159 respectively, light of two different wavelengths can be projected onto one photo detector 157. By the adoption of a configuration such as this, two images can be produced using one two-dimensional photo detector 157. Although the configuration in this embodiment is one in which two different wavelengths are projected, in actual practice, a configuration can be adopted in which light of more than two wavelengths is projected.

FIG. 18 shows an example in which two line shaped lights 160, 161 from mirrors 156, 154 are juxtaposed in the lateral direction and received by the photo detector 157. FIG. 19 shows an example in which two line shaped lights 162, 163 from the mirrors 156, 154 are juxtaposed in the vertical direction (up/down direction in the diagram) and received by the photo detector 157. When the light is received in two lines in the up/down direction of the photo detector 157 as shown in FIG. 19, the light of two wavelengths can be received without reduction in the resolution of the image.

Using the present invention, a non-confocal image can be produced that is not confocal. By the employment of a two-dimensional element as the light modulation member in which the shade pattern is alterable, the leading of the whole of the laser light to the sample body surface and, furthermore, the scanning of the galvanometer mirror to irradiate the illumination light across the entire field of view, the light from the sample body, using a photo detector, can be produced as an image. By way of example, when the embodiment of FIG. 1 is employed, if the laser 13 is irradiated and all of the light modulation member 4 is switched ON to scan the galvanometer mirror 5 and illuminate the sample body, the reflected light, fluorescence and light generated from the sample body will be reflected again by the galvanometer mirror 5 and, by way of the light modulation member 4, is led to the imaging device 12. As a result, the reflected light or fluorescence of a normal sample body can be observed.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A scanning optical microscope comprising:
    an illumination light source;
    a lens member for altering the cross-sectional shape aspect ratio of a beam of light emitted from the light source;
    at least one lens for converging beams of light of different cross-sectional shape aspect ratio to create a linear light;
    a first light modulation member for imparting shade to the converged linear light, the first light modulation member being disposed with regard to the at least one lens such that the linear light is incident on the first light modulation member;
    at least one lens for forming the light to which the shade has been imparted as a parallel light;
    at least one scanning member for scanning in a vertical direction of the linear light, the at least one scanning member being disposed between the first light modulation member and a sample body;
    at least one lens for focusing the light to which the shade has been imparted to the sample body; and
    at least one lens for imaging the reflected light from the sample body or the light generated by the sample body on a light detecting element;
    wherein the light detecting element detects the light transferred from the sample body by the at least one lens.

2. The scanning optical microscope of claim 1, wherein the light detecting element is one of a line sensor, an imaging device, and a photo detector.

3. The scanning optical microscope of claim 1, wherein the illumination light source comprises one of a laser beam and a white light source.

4. The scanning optical microscope of claim 3, wherein the white light source is selected from a group consisting of a high-pressure mercury lamp, xenon lamp, halogen lamp and metal halide lamp.

5. The scanning optical microscope of claim 1, farther comprising a second light modulation member that can impart a confocal effect to light from the sample body, and the confocal effect can be one of optimized and reduced by changing of one of the beam diameter and number of the beams of the light transmitted though the light modulation member.

6. The scanning optical microscope of claim 1, further comprising a computer for controlling the start and stopping operations and the regulation of the scanning speed of the at least one scanning member, the illumination pattern of the light modulation member, and the ON/OFF irradiation of the illumination light on the sample body.

7. The scanning optical microscope of claim 1, farther comprising:
    a diffraction grating wherein interference fringes are formed by the splitting of light from the light source into a plurality of beams and the interference of this plurality of beams, and one of a lens and an optical member necessary for the formation of the interference fringes; and
    a digital minor device having a plurality of reflecting minors, each of the minors being capable of being switched ON and OFF, wherein each minor does not reflect incident light when in the OFF state and reflects incident light when in the on state.

8. The scanning optical microscope of claim 1, further comprising a one-dimensional mirror array consisting of two or more MEMS (Micro Electro Mechanical System) mirrors.

9. The scanning optical microscope of claim 1, further comprising one of:
    a liquid crystal plate having a changeable transmissivity; and
    an SLM (spatial light modulator).

10. The scanning optical microscope of claim 1, wherein the at least one scanning member is a galvanometer mirror and wherein the position of a single-point illumination light can be shifted temporally by controlling the light modulation member in which the shade pattern is alterable.

11. The scanning optical microscope of claim 1, wherein the light modulation member has means for imparting of various alterable shade patterns in which the shade pattern is alterable, wherein a confocal image is produced by a plurality of points and the sample body can be simultaneously illuminated.

12. The scanning optical microscope of claim 1, wherein the light modulation member is capable of altering a shade, wherein one segment of the visual field is simultaneously illuminated and the sample body is scanned with a linear light.

13. The scanning optical microscope of claim 1, characterized in that the lens member necessary for altering the cross-sectional shape aspect ratio of the beam of the light emitted from the light source comprises one of one or more cylindrical lens and one or more f theta lens.

14. The scanning optical microscope of claim 1, wherein the scanning member comprises one of a galvanometer mirror, polygon minor and acousto-optic modulator.

15. The scanning optical microscope of claim 1, wherein the sample body is scanned several times by linear illumination lights of different shade pattern, and one image is produced from the plurality of scanned data.

16. The scanning optical microscope of claim 1, wherein the illumination light source comprises a laser and a laser beam from the laser is introduced into the lens member though a fiber.

17. The scanning optical microscope of claim 1, wherein the illumination light source is an ultra-short pulse laser, and fluorescence from the sample body is observed by multi-photon excitation such as one of two-photon excitation and thee-photon excitation.

18. The scanning optical microscope of claim 17, wherein the ultra-short pulse laser comprises a titanium sapphire laser.

19. The scanning optical microscope of claim 1, further comprising a spectral diffraction device configured by the insertion of one of a diffraction grating, acousto-optic modulator and spectral element that employs a prism between a photo detector that receives light from the sample body and a light strength modulating member, wherein the photo detector is a two-dimensional photo detector.

20. The scanning optical microscope of claim 1, wherein non-linear light generated from the sample body can be received by one of secondary harmonic generation, third harmonic generation, Raman light and coherent anti-strokes Raman scattering).

21. The scanning optical microscope of claim 1, wherein the light detecting element is a two-dimensional imaging device.

22. The scanning optical microscope of claim 21, wherein the two-dimensional imaging device is selected from a group consisting of a high sensitivity cooled CCD camera, back-illuminated CCD camera, a cascade camera, and a CCD camera with an image intensifier.

23. The scanning optical microscope of claim 1, wherein the light detecting element is a line sensor.

24. The scanning optical microscope of claim 23, wherein the line sensor is selected from a group consisting of a photo diode array, a PMT array, and a line COD array.

25. The scanning optical microscope of claim 1, further comprising means for focusing a plurality of different wavelengths on the light detecting element.

* * * * *